(12) United States Patent
Ly et al.

(10) Patent No.: US 10,567,925 B2
(45) Date of Patent: Feb. 18, 2020

(54) ENABLING MULTICAST FOR SERVICE LAYER GROUP OPERATION

(71) Applicant: Convida Wireless, LLC, Wilmington, DE (US)

(72) Inventors: Quang Ly, North Wales, PA (US); Dale N. Seed, Allentown, PA (US); Chonggang Wang, Princeton, NY (US); Michael F. Starsinic, Newtown, PA (US); Zhuo Chen, Claymont, DE (US); Shamim Akbar Rahman, Cote St. Luc (CA); Catalina M. Mladin, Hatboro, PA (US); Rocco Di Girolamo, Laval (CA); William Robert Flynn, IV, Schwenksville, PA (US); Hongkun Li, Malvern, PA (US)

(73) Assignee: Convida Wireless, LLC, Wilmington, DE (US)

( * ) Notice: Subject to any disclaimer, the term of this patent is extended or adjusted under 35 U.S.C. 154(b) by 61 days.

(21) Appl. No.: 15/783,594

(22) Filed: Oct. 13, 2017

(65) Prior Publication Data
US 2018/0109929 A1 Apr. 19, 2018

Related U.S. Application Data

(60) Provisional application No. 62/407,818, filed on Oct. 13, 2016.

(51) Int. Cl.
*H04W 4/06* (2009.01)
*H04L 12/18* (2006.01)
(Continued)

(52) U.S. Cl.
CPC ............ *H04W 4/06* (2013.01); *H04L 12/185* (2013.01); *H04W 4/38* (2018.02); *H04W 72/005* (2013.01); *H04L 12/189* (2013.01)

(58) Field of Classification Search
CPC ....... H04W 4/06; H04W 4/38; H04W 72/005; H04L 12/185; H04L 12/189
See application file for complete search history.

(56) References Cited

U.S. PATENT DOCUMENTS

| 7,382,787 B1* | 6/2008 | Barnes ................... H04L 12/66 370/401 |
| 2011/0138064 A1* | 6/2011 | Rieger ............. H04N 21/25816 709/228 |

(Continued)

OTHER PUBLICATIONS

A. Rahman et al., "Group Communication for the Constrained Application Protocol (CoAP)", IETF: Requests for Comments 7390, ISSN: 2070-1721, Oct. 2014. (Year: 2014).*

(Continued)

*Primary Examiner* — Joshua Kading
(74) *Attorney, Agent, or Firm* — BakerHostetler

(57) ABSTRACT

Service layer multicast communications management may be achieved via indication by entities of multicast capabilities during service layer registration and self-subscription by the entities to the service layer. The service layer, or a managing application in communication with the service layer, may then maintain resources for multicast configurations, dynamically create multicast groups, and notify members via their self-subscription of the entities in the groups. The service layer may then further fan-out multicast messages, thereby allowing the originator of the multicast message to access recipients in multiple underlying networks without the need to configure communications directly. Fan-out may include unicasts to entities lacking multicast capabilities. Self-subscription may also be used, for example, in granting access control to a third party application.

19 Claims, 32 Drawing Sheets

(51) Int. Cl.
*H04W 4/38* (2018.01)
*H04W 72/00* (2009.01)

(56) References Cited

U.S. PATENT DOCUMENTS

| | | | |
|---|---|---|---|
| 2012/0254899 A1* | 10/2012 | Sharma | G06F 9/541 |
| | | | 719/328 |
| 2014/0369251 A1 | 12/2014 | Zhang | |
| 2016/0007137 A1* | 1/2016 | Ahn | H04W 4/70 |
| | | | 370/254 |
| 2016/0270137 A1* | 9/2016 | Yong | H04W 8/005 |
| 2018/0219646 A1* | 8/2018 | Del Carpio Vega | |
| | | | H04W 48/12 |
| 2018/0310141 A1* | 10/2018 | Yin | H04L 29/06 |

OTHER PUBLICATIONS

R. Vida et al., "Multicast Listener Discovery Version 2 (MLDv2) for IPv6", Network Working Group: Requests for Comments 3810, Jun. 2004. (Year: 2004).*

Z. Shelby et al., "The Constrained Application Protocol (CoAP)", IETF: Requests for Comments 7252, ISSN: 2070-1721, Jun. 2014. (Year: 2014).*

OneM2M TS-0001 V 2.10.0, "Functional Architecture", Oct. 2016, 422 pages.

OneM2M TS-0005 V1.4.1 "Management Enablement (OMA)" Feb. 29, 2016, 60 pages.

OneM2M TS-0004 V1.13.0 Service Layer Core Protocol Specification, Mar. 22, 2018, 258 pages.

Cain et al., "Internet Group Management Protocol, Version 3" Network Working Group RFC: 3376, Oct. 2002, 54 pages.

ARC Vice Chair et al, "ARC 28 TS-0001 CR Pack" Mar. 31, 2017, 23 pages.

3GPP TS 23.682 V11.4.0 3rd Generation Partnership Project; Technical Specification Group Services and System Aspects; Architecture enhancements to facilitate communications with packet data networks and applications (Release11), Jun. 2013, 29 pages.

3GPP TR 21.905 V12.0.0 "3rd Generation Partnership Project; Technical Specification Group Services and System Aspects; Vocabulary for 3GPP Specifications (Release 12)" Jun. 2013, 64 pages.

* cited by examiner

US 10,567,925 B2

ENABLING MULTICAST FOR SERVICE LAYER GROUP OPERATION

CROSS-REFERENCE TO RELATED APPLICATIONS

This application claims the benefit of U.S. Provisional Application No. 62/407,818, filed on Oct. 13, 2016, entitled "Enabling multicast for service layer group operation," the content of which is hereby incorporated by reference in its entirety.

BACKGROUND

Machine-To-Machine (M2M), Web-of-Things (WoT), and Internet-Of-Things (IoT) network deployments may support M2M/IoT service layers such as oneM2M, ETSI M2M, and OMA LWM2M operating across nodes such as M2M/IoT servers, gateways, and devices which host M2M/IoT applications and services. Operations of these kinds may include group communications, as described in, for example: the oneM2M-TS-0001 Functional Architecture; 3GPP TS 23.682 Group Services and System Aspects; IETF RFC 7390 Group Communication for the Constrained Application Protocol (CoAP); IETF RFC 7252 Constrained Application Protocol (CoAP); and IETF RFC 3810 Multicast Listener Discovery Version 2 (MLDv2).

SUMMARY

Service layer management of multicast groups may be achieved via indication of multicast capabilities during service layer registration, self-subscription by an entity at the service layer, maintenance of service layer resources for multicast configuration, creation of multicast groups by the service layer or a managing application, dynamic notification of multicast and service layer group creation, and triggering by the service layer to fan-out multicast messages to multiple underlying networks.

Entities may indicate their support for multicast through an indicator included in a registration request. This information may then be used by the service layer or a managing application to determine whether to create multicast groups and how to configure them.

Through self-subscription, an entity may set a subscription for the service layer to send an unsolicited request to the device entity. This allows the entity to be notified of an operation to one of the resources of the entity. For example, the entity may be notified of being added to a group membership that was created by a managing application. Self-subscription may also be used, for example, in granting access control to a third party application or to perform a management function requested by a third party application.

The service layer may expose a resource for configuring multicast parameters when creating a multicast group. Such a resource may also be created by a managing application which creates the multicast group. Functionality may be provided for configuring network parameters of service layers, entities, and devices, for example.

Dynamic service layer notification of service layer multicast group creation may, for example, include notifications to entities of the creation of a multicast group where network parameters are specified. Such notifications may further include information regarding the application content being requested.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
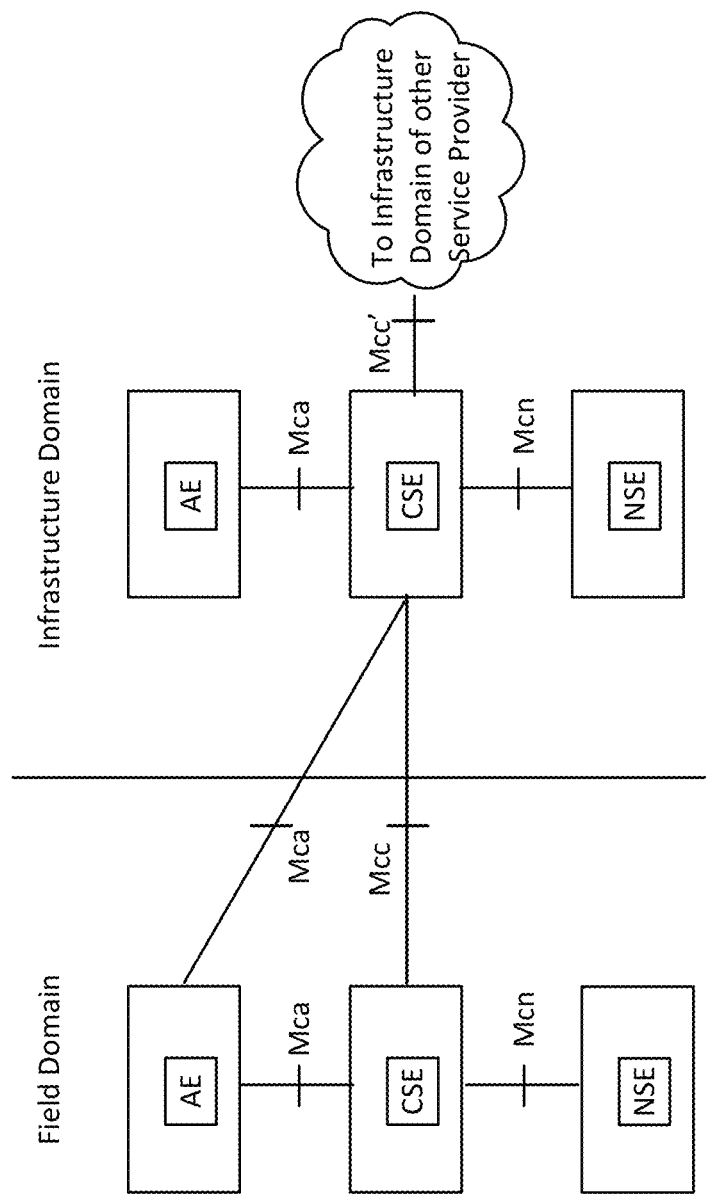
FIG. 1 shows an example oneM2M service layer architecture.

Service layer management of multicast groups may be achieved via indication of multicast capabilities during service layer registration, self-subscription by an entity at the service layer, maintenance of service layer resources for multicast configuration, creation of multicast groups by the service layer or a managing application, dynamic notification of multicast and service layer group creation, and triggering by the service layer to fan-out multicast messages to multiple underlying networks.

Entities may indicate their support for multicast through an indicator included in a registration request. This information may then be used by the service layer or a managing application to determine whether to create multicast groups and how to configure them. Through self-subscription, an entity may set a subscription for the service layer to send an unsolicited request to the device entity. This allows the entity to be notified of an operation to one of the resources of the entity. For example, the entity may be notified of being added to a group membership that was created by a managing application. Self-subscription may also be used, for example, in granting access control to a third party application. A third use case of self-subscription is for devices to be notified of management commands that may be requested by a third party application. The service layer may expose a resource for configuring multicast parameters when creating a multicast group. Such resource may also be created by a managing application which creates the multicast group. Functionality may be provided for configuring network parameters of service layers, entities, and devices, for example. Dynamic service layer notification of service layer multicast group creation may, for example, include notifications to entities of the creation of a multicast group where network parameters are specified. Such notifications may further include information regarding the application content being requested.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer.

Group operations may play an important role in reducing the message traffic within the system. Standard service layer architectures support group operations through group resources and fan-out procedures. However, the underlying execution of traditional fan-out procedures in such architectures does not take into account the multicast capabilities in the underlying networks. Taking advantage of such capabilities is highly desirable, for example, in IoT systems which may potentially involve billions of devices.

Traditional service layer architectures such as oneM2M provide the capabilities for group operations through the use of <group> and <fanOutPoint> resources. A requestor may create a <group> resource with multiple members and have the service layer execute operations to each of the members by targeting the <fanOutPoint> resource. To execute the group request, the service layer sends individual requests to each group member and aggregates the results back to the requestor.

Within underlying networks, there are often multicasting capabilities that the service layer may potentially use when executing group operations. An example is CoAP group communications. Another is Group Message delivery through the 3GPP Service Capability Exposure Function (SCEF). The standard CoAP protocol is bound to SL architectures such as oneM2M. 3GPP SCEF provides group communication capabilities for cellular networks. However, the standard service layer does not have mechanisms to exploit these capabilities.

Explanations of some 3GPP, IETF, and other abbreviations used herein are provided in Table 1 and Table 2 of the Appendix. For a more complete list of 3GPP abbreviations, for example, see 3GPP TR 21.905 Vocabulary for 3GPP Specifications.

oneM2M is a global standards body that is developing M2M/IoT service layer (SL) technology to address the challenges associated with the integration of M2M/IoT devices and applications into deployments with the Internet/Web, cellular, enterprise, and home networks. See, e.g., TS-0001 oneM2M Functional Architecture, V-2.6.0. The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering.

An M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

An M2M/IoT service layer may provide value-added services for M2M/IoT devices and applications. An example oneM2M service layer architecture is shown in FIG. 1. This architecture shows the various reference points associated with a Common Services Entity (CSE). The Mca interface provides service layer access to applications or AEs, while the Mcc and Mcc' reference points allow for CSE to CSE communications. The Mcn interface provides access to the underlying network technology. The Mcn interface is usually the interface to the 3GPP network. Herein, the term "Mcn" refers to interfaces to underlying networks generally, whether it is cellular or IP-based network such as Ethernet and/or WiFi.

Figure 2:
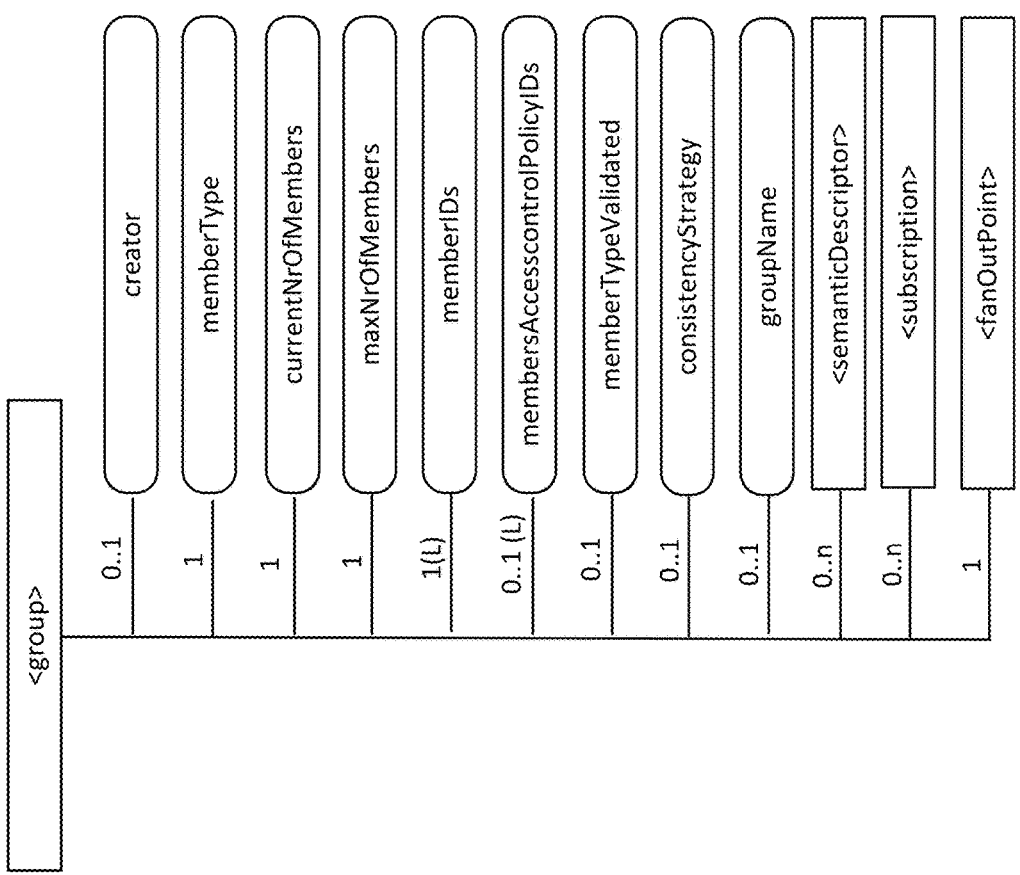
FIG. 2 shows an example group resource for oneM2M.

There may be many devices that communicate with a horizontal system such as an SL. In such a case, the group management functionality may play an important part in communications. This service may be exercised through the use of a group resource such as the one shown in FIG. 2 for oneM2M, in which group members are specified in the memberIDs attribute. A user, e.g., an AE, may then perform group operations on the members of a <group> resource by targeting an operation on the <group>'s <fanOutPoint> virtual resource. In turn, the service layer may send out individual operation requests to each of the group members and aggregate the responses back to the user.

Figure 3:
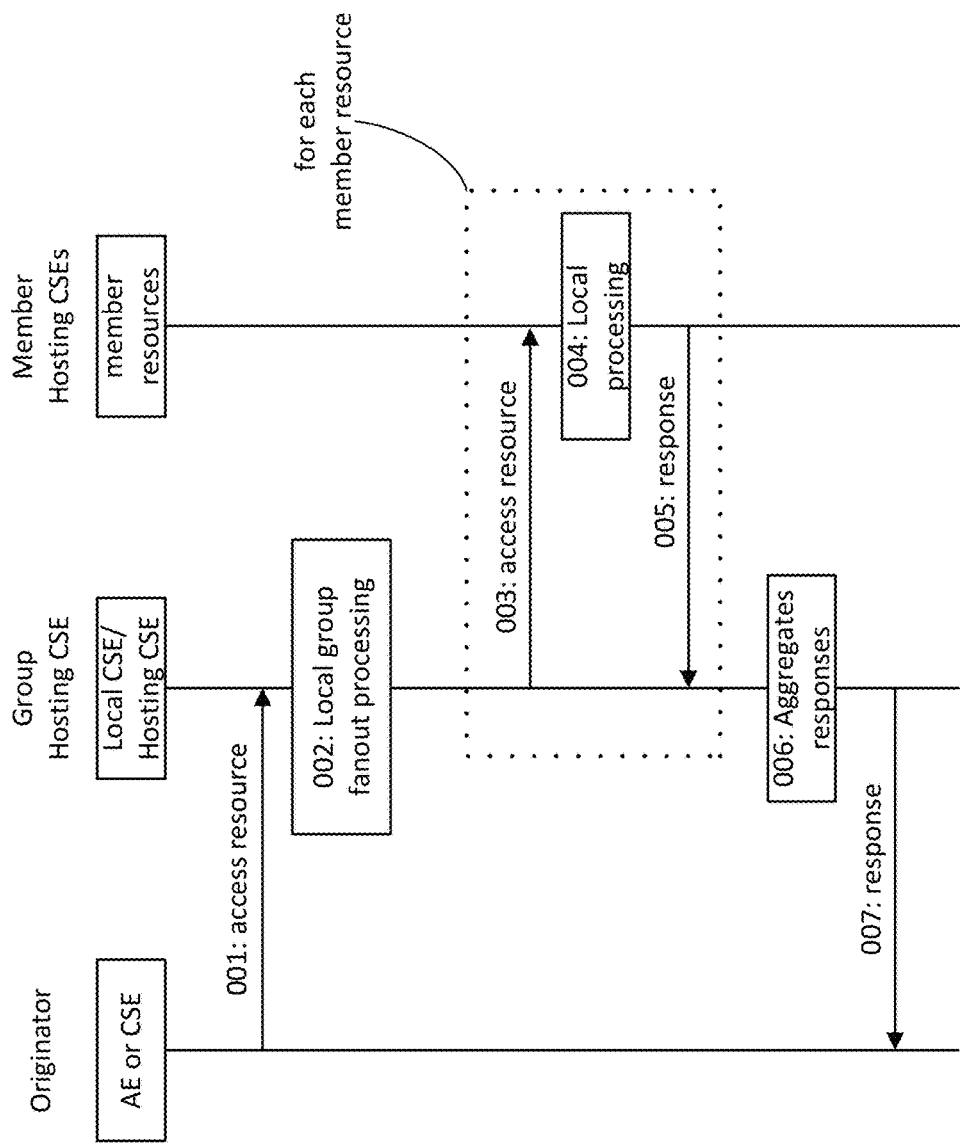
FIG. 3 shows an example call flow of the management of a oneM2M fan-out operation.

FIG. 3 shows an example call flow for the management of a oneM2M <fanOutPoint> operation. In step 1, an originator AE or CSE sends a group request targeting a <fanOutPoint> virtual resource to a group hosting CSE. In step 2, the group hosting CSE checks whether the requestor has access control privileges. If the requestor has such privilege, then in Step 3 group hosting CSE "fans out" the request to each of the group members found in the memberIDs attribute of the <group> resource. The terms "fans out" and "fan-out" herein refer to a CSE sending an individual unicast request to each member of a group. The fan-out requests of Step 3 are similar to the original request sent in Step 1. In step 3, the target of each message is changed for each group member. In Step 4, each member performs checks such as access control checks, and formulates a response. In Step 5, each member sends a response. In Step 6, upon receiving the responses from each member, the group hosting CSE aggregates the responses. In Step 7, the group hosting CSE returns an aggregated response to the originator AE or CSE.

Figure 4:
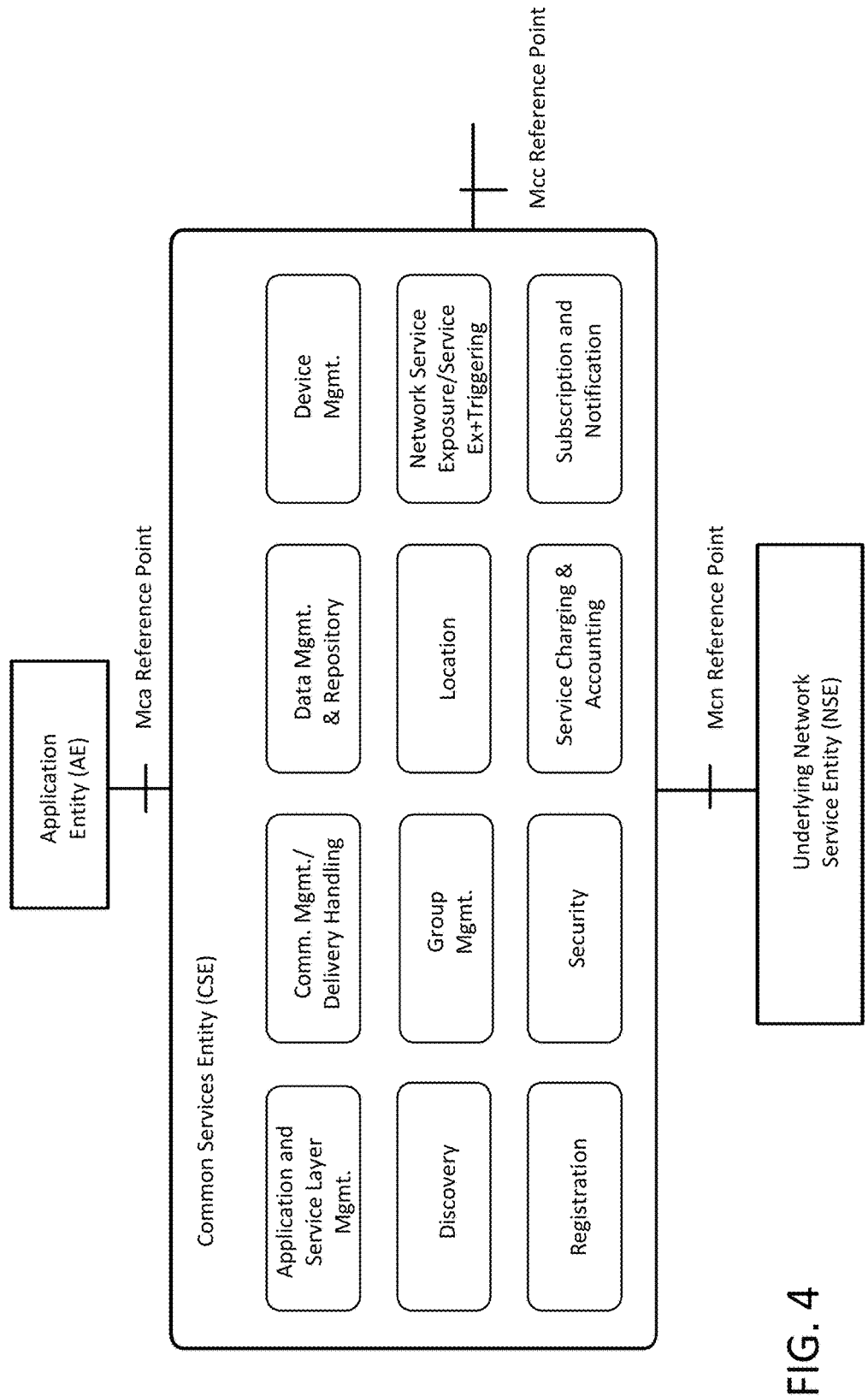
FIG. 4 illustrates services that may be offered by a service layer architectures such as oneM2M.

Device management (DM) is an important feature that is offered by service layer architectures such as oneM2M, as shown in the example of FIG. 4. Devices deployed remotely may be managed through an application communicating with the service layer. The application may then manage the device's configuration, download and install software on the device, and even remotely diagnose the device. The DM functionality provides the service layer access to the underlying device platform, whether it is for interfacing to some Operating System (OS) calls, a device driver to control some lower level hardware such as a General Purpose Input/Output (GPIO) pin, or some API calls to the protocol stack. See, e.g., clause 9.6.15 of oneM2M TS-0001.

Figure 5:
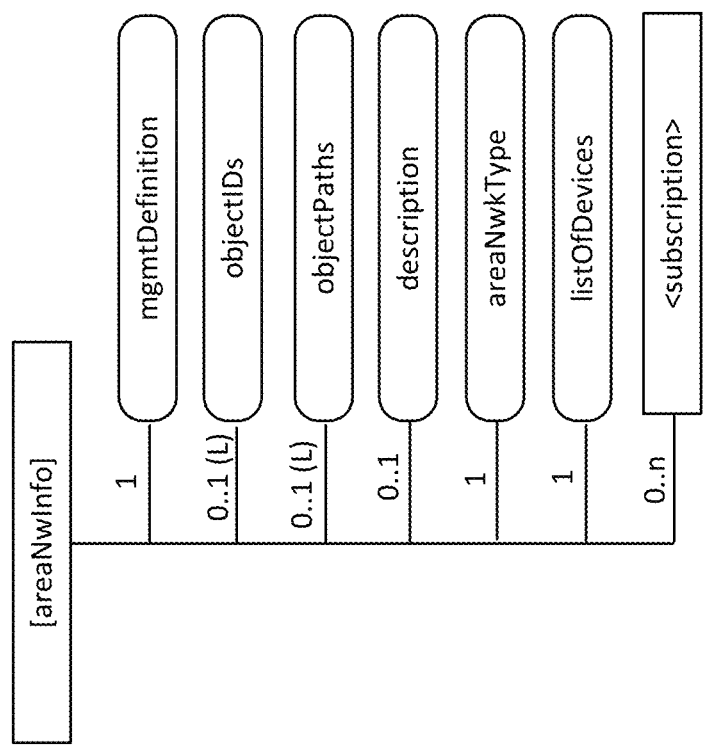
FIG. 5 shows a oneM2M resource used to provide area network information.

Within service layers, resources exist for device management purposes. These resources, called management object (<mgmtObj>) resources in oneM2M, allow applications registered to the service layer to enable configuring, managing, and initiating actions on devices. FIG. 5 shows a oneM2M areaNwkInfo <mgmtObj> resource, which is a DM specific <mgmtObj> resource used to provide area network information. In Table 3, of the Appendix areaNwk-Type and listofDevices are attributes of the area network.

Figure 6:
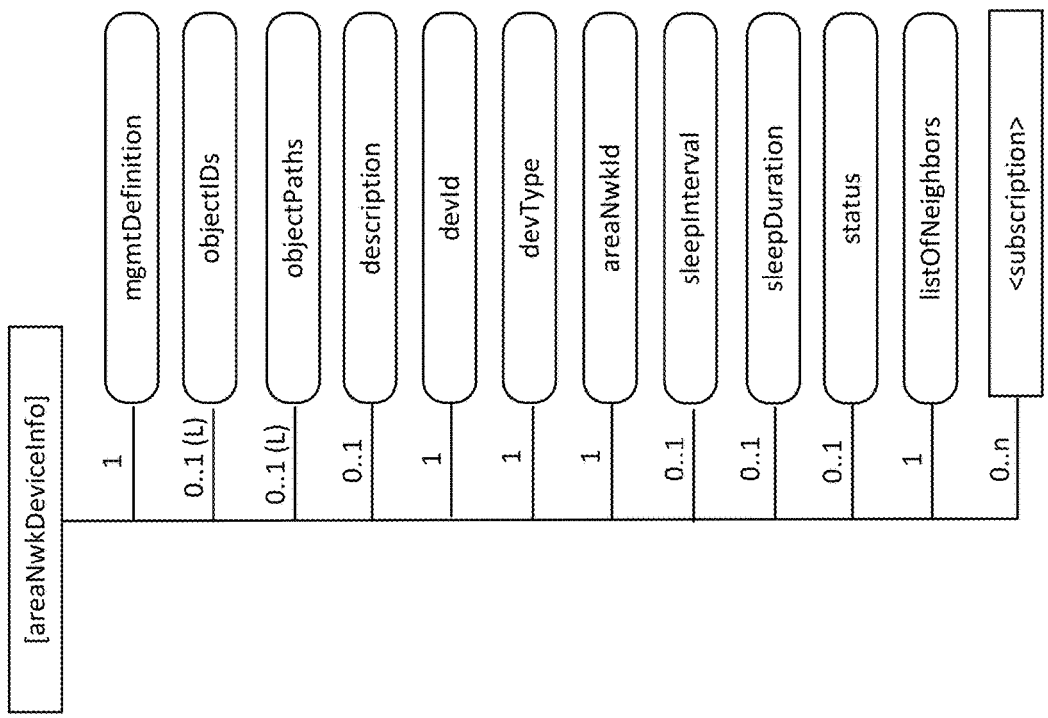
FIG. 6 shows a oneM2M resource used to provide network configuration information.

Another oneM2M <mgmtObj> resource that provides network configuration information is the [areaNwkDeviceInfo], which is shown in FIG. 6. This resource, in contrast to [areaNwkInfo], provides network information about the devices themselves rather than the local network. Table 4 of the Appendix shows example network information of the device in the attributes sleepinterval, sleepDuration, status, and listOfNeighbors.

IETF RFC 7390 Group Communication for the Constrained Application Protocol (CoAP) describes processes and procedures for performing group communications at the CoAP layer. The protocol focuses on using CoAP for communications involving one-to-many endpoints using underlying IP multicast protocols, such as MLD, while using RESTful methods. Receiving CoAP servers may optionally respond via unicast requests, and the CoAP client may receive various response codes associated with the multicast request it sent. According to IETF RFC 7390, the use of group communications "offers improved network efficiency and latency among other benefits." There are many other details provided in RFC 7390 that describe how to set up and manage groups, complementary technologies to group communications, and CoAP protocol related updates. Two main CoAP requirements are that when the URI path is selected, the same path MUST be used across all CoAP servers in a group, and that all CoAP requests that are sent via IP multicast must be Non-confirmable.

Figure 7:
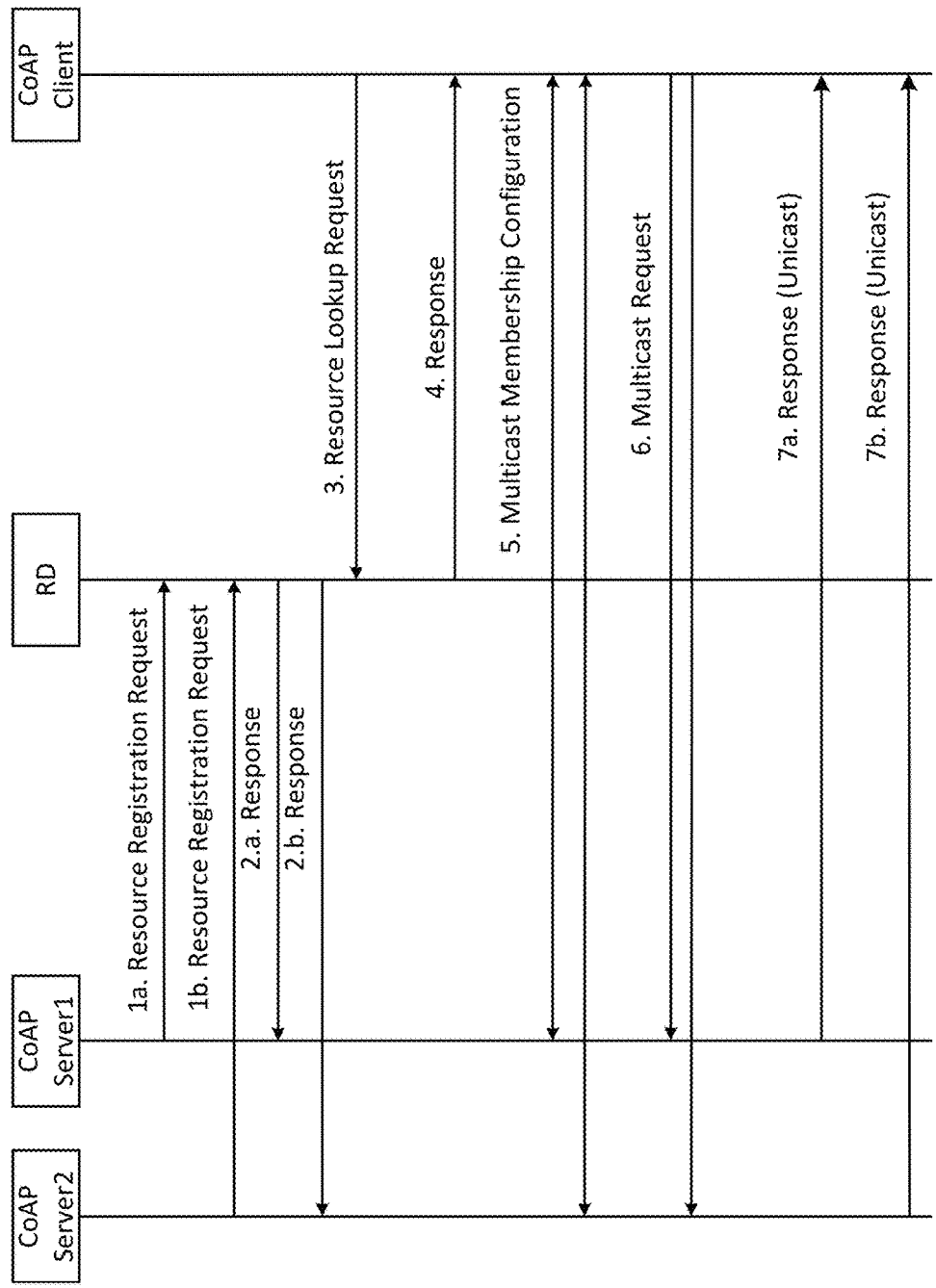
FIG. 7 shows an example call flow in which CoAP servers return unicast responses to a multicast request.

CoAP multicast may be utilized within Resource Directory (RD) entities in context-aware applications, whereby CoAP servers register with an RD and provide information about their resources, such as accuracy. Then a CoAP Client may query the RD for resources having a certain accuracy, upon which the RD returns a list of CoAP servers that meet the accuracy criteria. The CoAP client then configures multicast memberships to each of the CoAP servers and then performs the multicast operation. The CoAP servers each return a unicast response to the CoAP client with the requested resource. FIG. 7 illustrates this process. In Steps 1a and 1b, CoAP Servers 1 and 2 each send a resource registration request to the resource directory (RD), e.g., {Req: POST coap://rd.example.com/rd?ep=node1 Payload: </temp1>; rt="temp";accuracy=91%}. In Steps 2a and 2b the RD acknowledges the requests. In Step 3, a CoAP client sends the RD a resource lookup request, e.g., {GET coap://rd.example.com/rd-lookup/res? rt=temp;accuracy>=90%}. In Step 4 the RD responds to the CoAP client with 2.05 content, e.g., {2.05 Content <coap://{ip1:port1}/temp1>; rt="temp"; accuracy=91%, <coap://{ip2:port2}/temp2>; rt="temp"; accuracy=92%}. In Step 5 the CoAP client communicates with CoAP Servers 1 and 2 for multicast membership configuration. In Step 6, the CoAP client sends a multicast request to the CoAP servers 1 and 2, e.g., with {Multicast Address, contextType=accuracy}. In steps 7a and 7b each of the CoAP servers 1 and 2 responds to the CoAP client with unicast responses, e.g., with {Content, contextValue=accuracyValue}.

The IETF RFC 7252 Constrained Application Protocol (CoAP) was designed for use in IoT systems where device resources such as CPU, RAM, and ROM are limited. This lightweight protocol offers functionality similar to HTTP that is widely used in the Internet, but requires less resources to operate. Small sensor devices will typically use this protocol and, as a result, oneM2M has provided binding to CoAP. Furthermore, CoAP provides for multicasting capabilities while HTTP does not since CoAP uses UDP, which is a connectionless protocol.

IETF RFC 3810 Multicast Listener Discovery Version 2 (MLDv2) for IPv6 describes the use of multicast operations in an IPv6 network. MLDv2 is an asynchronous protocol that specifies separate behaviors for multicast listeners and multicast routers. IETF RFC 3376 Internet Group Management Protocol Version 3 (IGMPv3) follows similar operations but applies to IPv4 networks. In both protocols, an application that is interested in receiving multicast messages calls an API on the device and provides a multicast address it will be listening on. This triggers an MLD Report that is sent to the multicast router. The router adds the multicast address to the list of IP addresses to which the router forwards messages. When an application is no longer interested in receiving multicast messages, it then requests that an MLD Done message be sent, which will result in the removal of the multicast address from the router's list. Multicast routers will only forward multicast messages if there are listeners on the multicast address. In addition, multicast routers do not keep track of how many listeners there are, or who the listeners are. Routers are only concerned with whether there is at least one listener.

Typically, when a multicast capable application launches, it will call the Start Listening operation via a similar API to the one listed below to enable sending the MLD report shown in FIG. 8. The configuration of the multicast address may be provisioned by the application code itself, by the application user, or by a network administrator. Then when the application closes, the Stop Listening operation is called to stop sending the MLD report. In Example 1 and 2, the same API is called but with different parameters EXCLUDE and INCLUDE. In practice, separate API calls may be used. Multicast is enabled through the combination of the network configuration of a multicast address and the application initiating the device to listen to the configured address.

EXAMPLE 1

| Start Listening |
| --- |
| IPv6MulticastListen (socket, interface, IPv6 multicast address, EXCLUDE, { }) |

EXAMPLE 2

| Stop Listening |
| --- |
| IPv6MulticastListen (socket, interface, IPv6 multicast address, INCLUDE, { })" |

Figure 8:
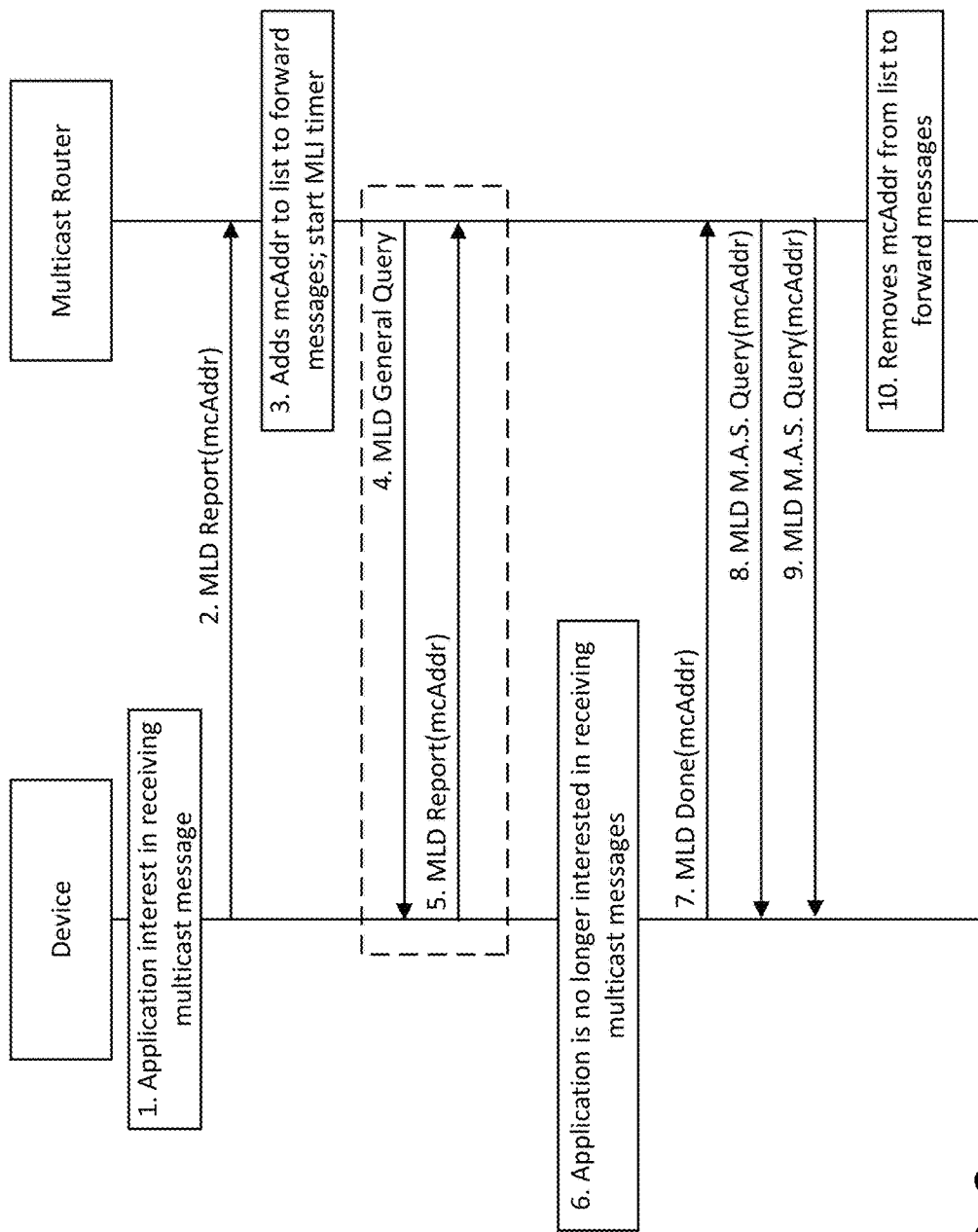
FIG. 8 shows an example call flow involving a multicast capable application.

FIG. 8 shows an example use of the MLDv2 protocol. In step 1, an application on the device is interested in receiving multicast messages from a multicast address mcAddr. This may be triggered at the application layer via a user. In step 2, the device sends a MLD Report message with mcAddr to the multicast router to indicate that it is interested in receiving multicast messages targeting mcAddr. In step 3, the router adds mcAddr to the list of multicast addresses it maintains, and will forward any message targeting mcAddr. It starts a Multicast Listener Interval (MLI) timer internally to maintain mcAddr in the list.

In step 4, when the MLI timer expires, the router sends an MLD General Query to check if any nodes in the network are still interested in receiving multicast messages. In step 5, the device is still interested and sends another MLD Report message with mcAddr. Steps 4 and 5 are repeated as long as there is a node that is interested in receiving multicast messages. The device has its own timer and when it expires, it sends an MLD Report with mcAddr. Timer values are specified in RFC 3810.

In step 6, the application is no longer interested in receiving multicast messages. In step 7, the device sends an MLD Done message to indicate to the router it wants to cancel its interest in mcAddr. In step 8, the router sends an MLD Multicast Address Specific (MAS) Query to check if there are any other nodes interested in mcAddr. In step 9, the router resends the M.A.S. Query to confirm no other node is interested in mcAddr. In step 10, the router removes mcAddr from its multicast address forwarding list.

Figure 9:
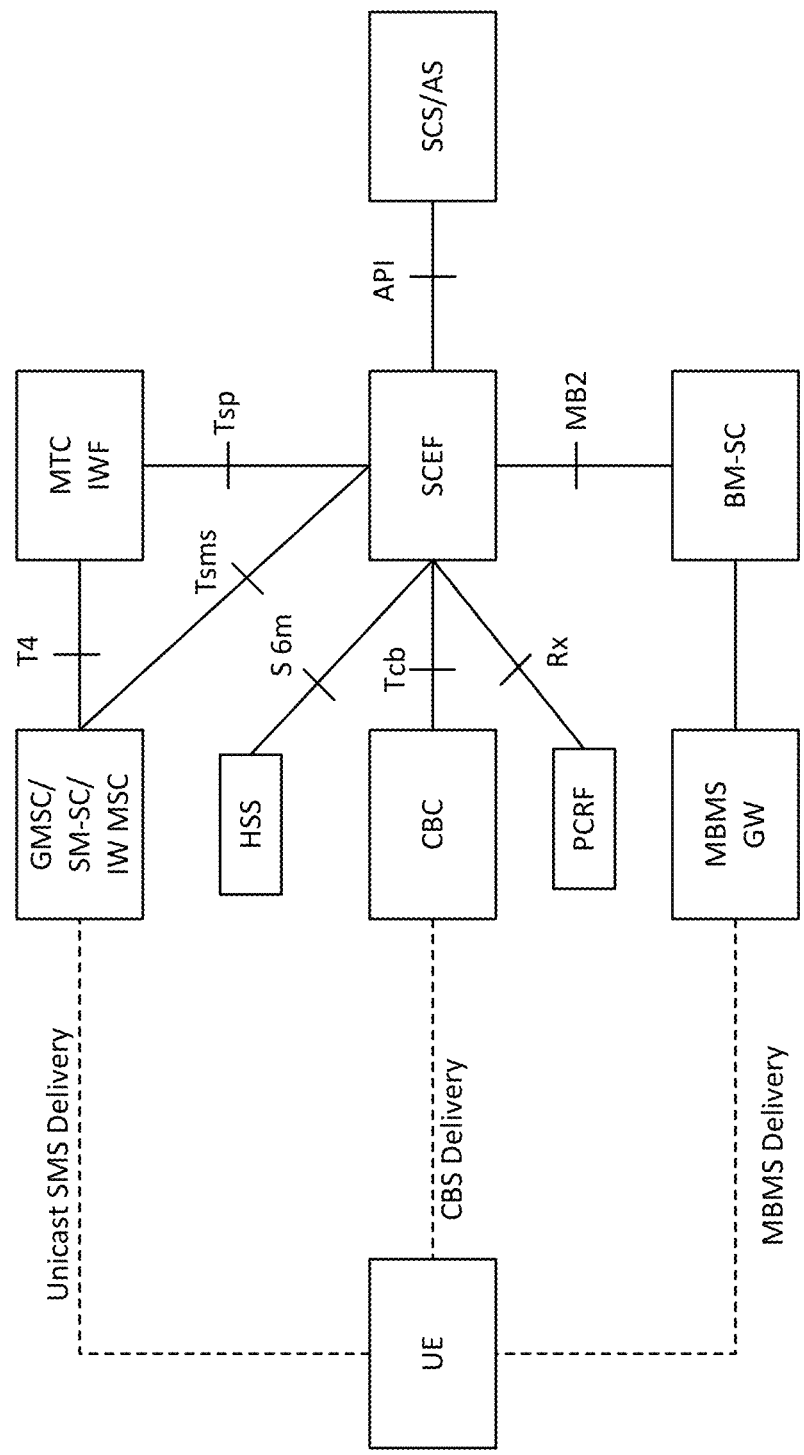
FIG. 9 shows an example 3GPP architecture for group services offered by a cellular network.

FIG. 9 shows an example 3GPP architecture for group services offered by a cellular network. See, e.g., 3GPP TS 23.682 Group Services and System Aspects, V13.5.0. "SCS/AS" is a term used in 3GPP for a server. An SCS/AS may implement a service layer or an application, for example. In the example of FIG. 9, a Service Capability Exposure Function (SCEF) acts as an interface between the SL and the cellular network, and exposes APIs, or an interface, that allows the SCS/AS to access the services of the core network. Among the services offered to the SL may be the ability to create groups, manage groups, and send messages to groups of User Equipment (UE) devices.

Figure 10:
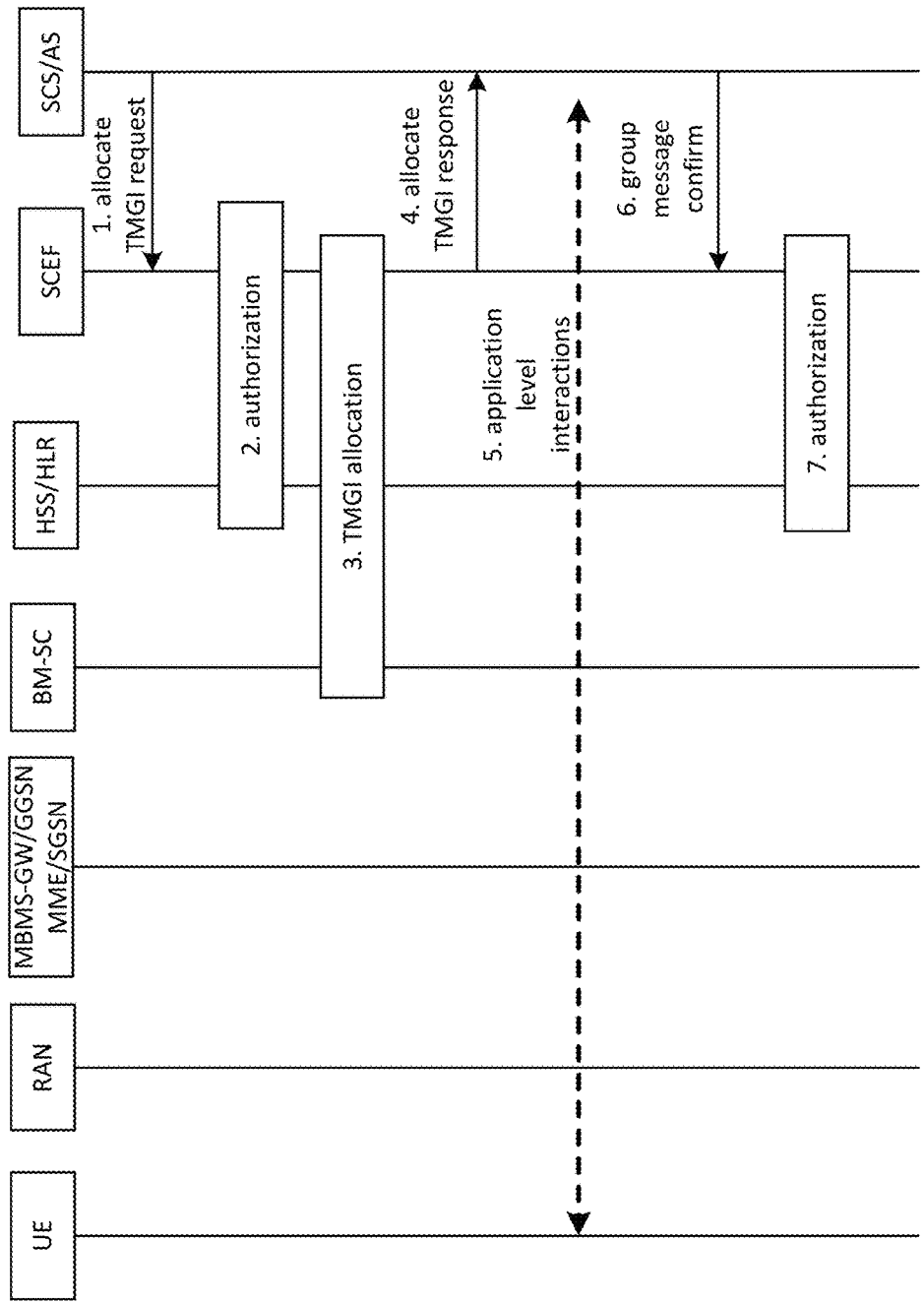
FIG. 10 shows an example call flow for communications between an SCS/AS and an SCEF in creating and managing groups of UEs.
Figure 11:
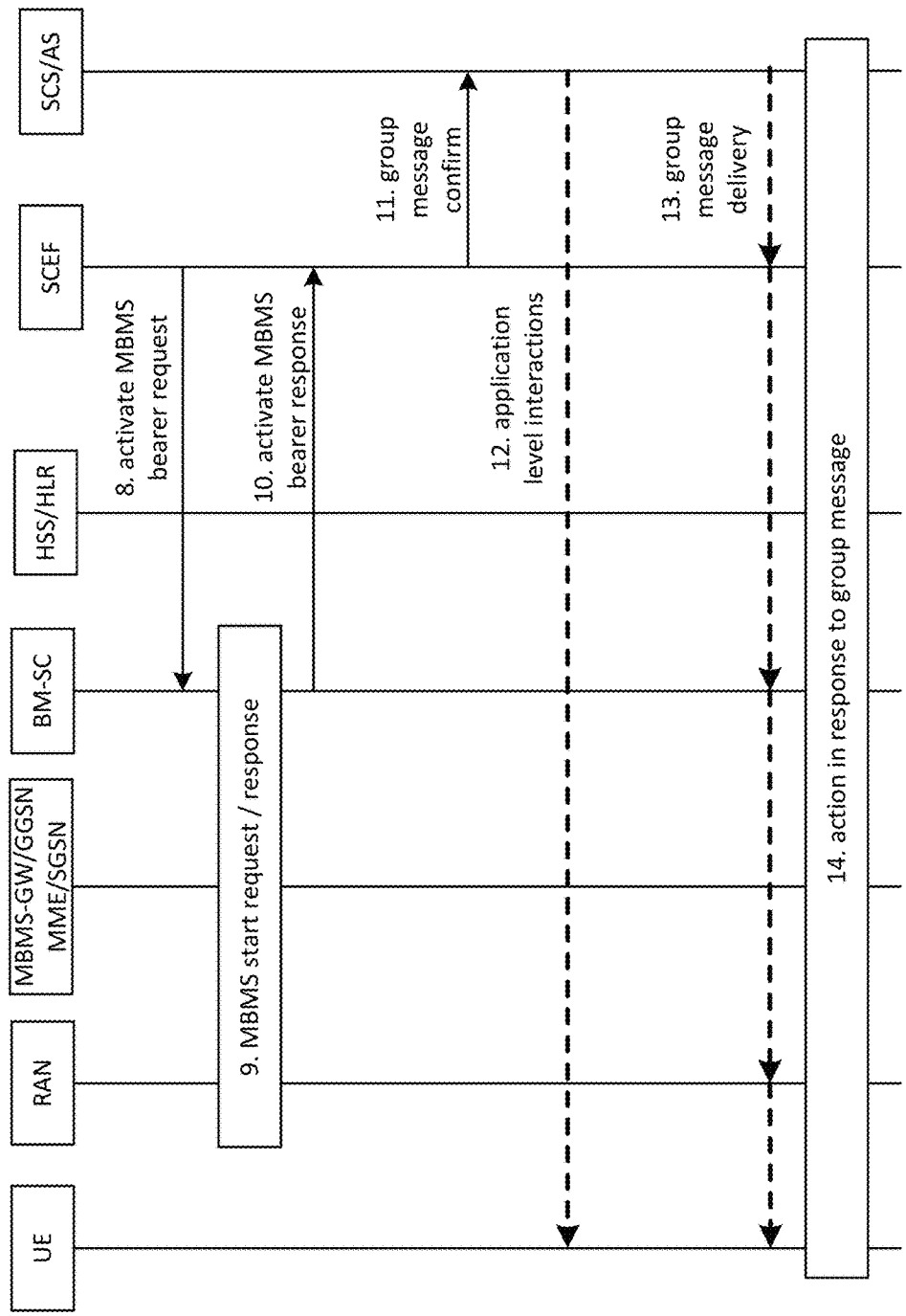
FIG. 11 is a continuation of the call flow of FIG. 10.

FIGS. 10 and 11 show an example method for communications between the SCS/AS and the SCEF in creating and managing groups of UEs. After an SCS/AS creates a group, it may follow the steps in FIGS. 10 and 11 to create the corresponding group in the cellular network. The 3GPP network must first allocate a Temporary Mobile Group Identity (TMGI) to identify the group. This TMGI is used as part of the 3GPP Multimedia Broadcast Multicast Service (MBMS), which is the service that provides multicasting capabilities. The example of FIGS. 10 and 11 is described in 3GPP TS 23.682 Group Services and System Aspects, V13.5.0. Steps 1-5 may be skipped if a valid TMGI allocation already exists or if the MBMS bearer activation is performed without TMGI pre-allocation. The interactions between the SCEF and the SCS/AS (in steps 1, 4, 6, 11 and 13) are outside the scope of 3GPP and are shown for informative purposes only.

In step 1, if there is no assigned TMGI for an External Group Id, the SCS/AS sends the Allocate TMGI Request (External Group ID, SCS Identifier, location/area information) message to the SCEF. The SCS/AS may determine the IP addresses or ports of the SCEF by performing a DNS query using the External Group Identifier or using a locally configured SCEF identifier/address. The SCEF checks that the SCS/AS is authorized to request TMGI allocation.

In step 2, the SCEF determines whether the SCS/AS is authorized to request TMGI allocation. In step 3, the SCEF initiates TMGI allocation by the BM-SC, per the TMGI Allocation Procedure specified in TS 23.468. In step 4 The SCEF sends the received TMGI and expiration time information to the SCS/AS. The SCEF may cache the serving BM-SC Identity information and mapping between External Group ID and TMGI.

In step 5, application level interactions may be occur for the devices of a specific group to retrieve the related MBMS service information, e.g., TMGI, start time.

In step 6, the SCS/AS sends the Group Message Request (External Group Identifier, SCS Identifier, location/area information, RAT(s) information, TMGI, start time) message to the SCEF. The location/area information indicated by the SCS/AS may be geographic area information.

In step 7, the SCEF checks whether the SCS/AS is authorized to send a group message request. If this check fails, the SCEF sends a Group Message Confirm message with a cause value indicating the reason for the failure condition and the flow stops at this step. In the example of FIG. 10, the SCS/AS may subsequently release the TMGI allocated at step 3 by requesting an explicit de-allocation, or may rely on the expiration timer. Authorization of Group Message delivery using MBMS towards a specific group is not specified in this release of the specification.

The call flow of FIG. 10 continues in FIG. 11. In step 8 of FIG. 11, the SCEF sends an Activate MBMS Bearer Request (MBMS broadcast area, TMGI, QoS, start time) message to the BM-SC. The SCEF maps between location/area information provided by the SCS/AS and the MBMS broadcast area for the distribution of the content to the group based on configuration in the operator domain. The SCEF needs to be aware that the selected MBMS broadcast area may result in broadcast of the content over an area larger than the area that may be indicated by SCS/AS.

In step 9, BM-SC performs the Session Start procedure. In step 10, the BM-SC sends an Activate MBMS Bearer Response to the SCEF. In step 11, the SCEF sends a Group Message Confirm (TMGI (optional), SCEF IP addresses/port) message to the SCS/AS to indicate whether the Request has been accepted for delivery to the group.

In step 12, application level interactions may take place among devices of a specific group for retrieval of MBMS service information, such as TMGI, start time.

In step 13, at or after the requested start time, but before the expiration time, the SCS/AS transfers the content to be delivered to the group to the SCEF using the IP address and port received at step 11. The SCEF delivers the contents to the BM-SC via MB2-U, using the IP address and port received at step 9. The BM-SC transfers the corresponding content to UEs. If the SCS/AS expects the UEs to respond to the delivered content, then to avoid that potential responses to the broadcast message by high numbers of devices are sent at almost the same time, the SCS/AS may make sure that the UEs are provided with a response time window. Subsequent to this step, it is up to the SCS/AS if the MBMS bearers will be kept active and allocated and for how long. The mechanisms defined in TS 23.468 may be used by the SCEF to release the MBMS resources.

In step 14, in response to the received content, the UE may initiate immediate or later communication with the SCS/AS. The UE application ensures that the distribution of any responses occurs within the response time window.

Figure 12:
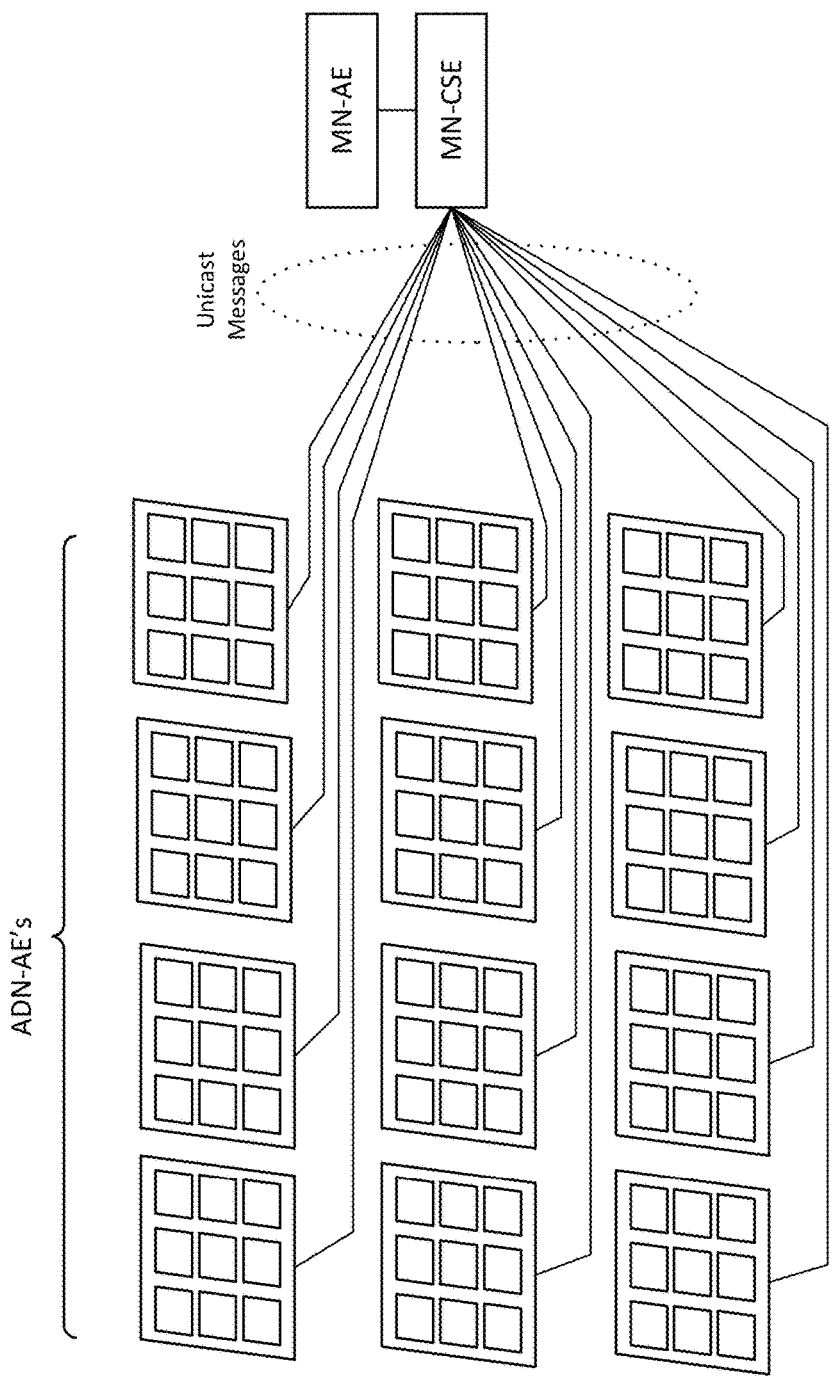
FIG. 12 shows a system diagram of an example solar farm.

FIG. 12 shows a solar farm configuration which consists of wireless solar panels, access points in the field, and a backend application for controlling the adjustments of the solar panels. The solar panels run oneM2M ADN-AEs. The access points run oneM2M MN-CSE, and the backend application is a oneM2M MN-AE or an IN-AE. Each MN-CSE manages all the panels within its proximity, and a group is created for the solar panels that each MN-CSE manages. As the sun's position changes, the MN-AE or IN-AE sends a fan-out command to rotate and/or tilt the motorized mounts to the most optimal position. The MN-CSE executes the fan-out command by unicasting the command to each solar panel to make the adjustments. It then aggregates the responses from each solar panel and responds to the MN-AE or IN-AE with the results.

As may be seen in the solar farm use case, standard SL group operations are inefficient when executing the fan-out operation. The SL in these cases unicasts the request to each member of the group. Current technologies such as CoAP Group Communications (with support of IP multicasting) and 3GPP MBMS allow for multicasting in the underlying networks. However, the SL does not currently support mechanisms to enable these underlying technologies.

Standard SLs have some resources which provide network parameters of devices as well as the local area network itself, such as a list of devices within the local area network, a list of device's neighbors, and the sleep state of the devices. This information may be used for multicast operations, e.g., to reschedule multicast messages if devices are sleeping. However, the resources do not provide enough information to allow the SL to create and manage multicast groups.

In general, group operations may be preferred for devices that provide similar functionalities, devices that are located in close proximity to each other, or for operations that are repeated periodically. Standard SL group procedures, however, generally do not account for these characteristics when executing the fan-out operation.

Figure 13:
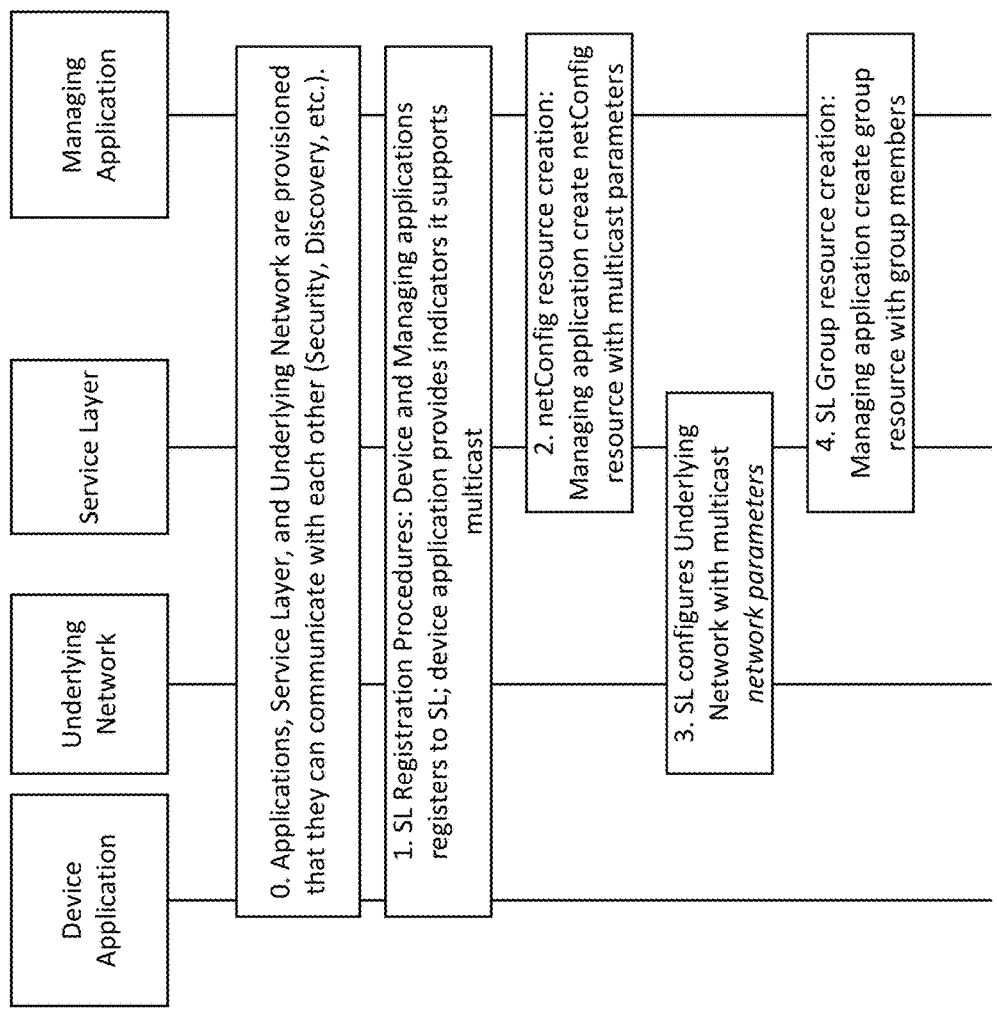
FIG. 13 shows an example call flow in which device applications register with the service layer.
Figure 14:
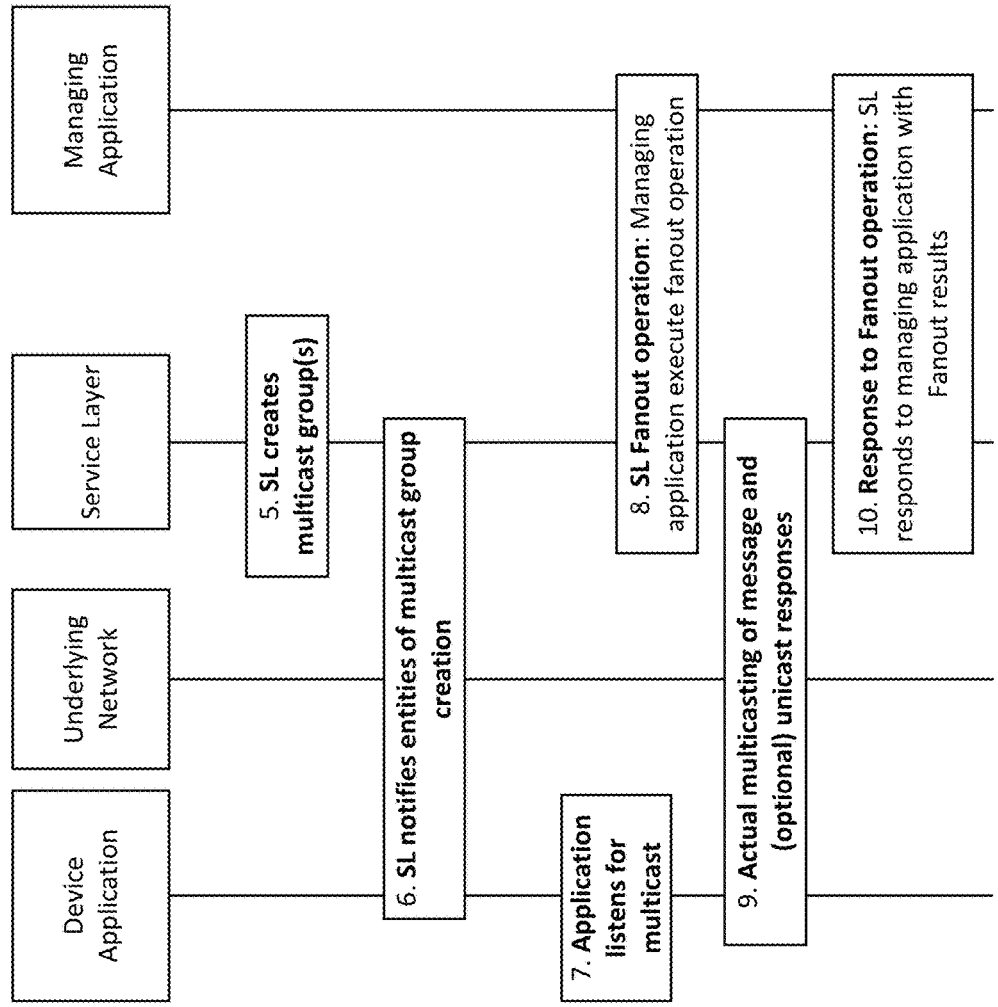
FIG. 14 is a continuation of the call flow of FIG. 13.

FIGS. 13 and 14 show a high level call flow summarizing example methods of enabling multicast in SL group operation, whereby an SL may create a multicast group based on information provided by device applications, and an SL application may be provisioned with multicast information and configure the necessary SL resources. In step 0 of FIG. 13, the applications, service layer, and underlying networks are provisioned that they are able to communicate with each other.

In step 1 device applications register with the service layer. As part of this registration, device applications may provide multicast capable and self-subscription indicators to empower the SL to create and manage multicast groups. In this scenario, the SL implicitly creates the self-subscription resource on behalf of the device application. Alternatively, device applications may explicitly create the self-subscription resource themselves and a managing application will then create the multicast group.

In step 2, a netConfig resource is created. This resource provides the ability to configure network parameters within the entities/devices analogous to those used in MLDv2. It configures the multicast address and other network parameters the entity application uses to monitor multicast messages. The configuration may be performed by a device itself, as in MLDv2. Alternatively, the resource may be configured by a managing application similar to the network administrator of MLDv2, or by the SL itself. The netConfig resource may also trigger a process to obtain underlying network identifiers, if such is not provided in the case the device application creates the resource. Similarly, a managing application may provide the underlying network identifiers when creating the netConfig resource if it was provisioned with them.

In step 3, the SL may optionally configure the underlying network or another SL with the network parameters provided by the netConfig resource. This may be used, for example, to support dynamic notifications of SL multicast group formation.

In step 4, SL multicast group resources are created to provide the content of the actual multicast request sent in step 9.

The call flow begun in FIG. 13 continues in FIG. 14. Referring to FIG. 14, in step 5 SL multicast groups are formed within the service layer. This involves combining the network parameter configuration provided by the netConfig resource with the contents of the SL group resource provided in step 4. In other words, the SL group resource provides the content that goes into the multicast request. As a result, both the netConfig and group resources are required to form the SL multicast group. The SL multicast group is "virtual" in that it is dynamically built by the combination of the netConfig and SL group resources in real time.

In step 6, once the SL multicast group is created, the SL notifies the entities of their membership in the multicast group. This notification was enabled when the entities created their "self" subscription with the SL. The notification completes the setup of the multicast system from the source SL to the destination entities. The notification also allows for sharing differentiated content when the content requested is not the same for all entities. For example, member resources may be different and have different URIs. The notification may then provide both a multicast URI and a resource URI to address the differences.

In step 7, within the entities, the notification enables it to call the underlying multicast API. This step is analogous to a user launching a multicast application using traditional IP multicast cases, but here there is a level of coordination between the source and destination entities that is not found in traditional IP multicast. The entities then begin listening for the multicast messages. Alternatively, the notification received in step 6 may provide a schedule of when to start listening for multicast messages.

In step 8, an SL application performs a fan-out to a previously created group based on a RESTful operation.

In step 9, the SL sends the multicast messages and waits for individual responses from the entities. Since the SL may know each device's sleep state through various resources, and the SL may not need to wait for a response from a sleeping device. This optimizes the multicast operation within the SL.

In step 10, once all responses are received, the SL returns the aggregated responses to the requesting application.

SL interactions for enabling multicast operations within an IoT system may occur in a number of ways. An SL gateway may manage many devices behind it, and may be the entity that initiates the multicast message. An SL may interact with an underlying network to configure group messaging. In both cases, creation of an SL multicast group may be initiated by a managing application. Any SL application with access privileges may initiate the creation of a multicast group. Device applications, which are the ultimate targets of the multicast message, may also participate by adding themselves to an SL group resource. In these cases, the device application retrieves the multicastIDs attribute of the group resource to identify the netConfig resource. Then the application retrieves the netConfig resource to obtain the multicast address and network parameters, after which it calls an API to start/stop listen to the multicast, e.g., as shown in Example 1 and Example 2. Finally, the device application may add itself to the members of the group in the group resource.

An SL may utilize the multicast capability of an existing IP multicast infrastructure. With information provided by the netConfig resource, the SL may configure a device to monitor traffic at a multicast address, and to send the multicast message to the multicast router that is managing the device. Upon receiving the notification of its inclusion in a multicast group, the device may use underlying MLD protocol to inform the multicast router of its interest in a particular multicast address. Such data may be included in the netConfig resource.

There may be cases where multiple SL multicast group configurations are enabled for a particular SL group resource. Such cases may occur, for example, when members of the SL group are located in separate networks that support multicast, e.g., local area network and cellular network multicast groups. In such cases, there may be multiple local area networks, cellular networks, or combinations of these networks. It is also possible that some members of a group do not support multicast and hence, a unicast request is made to those member. In those cases, a combination of multicast and unicast requests would be used.

Traditional service layer registration may be enhanced by an indication, such as a flag in a registration request, that an entity is capable of supporting multicasting. Registration may be further enhanced by the use of a self-subscription indication, which may be another flag in a registration request. The multicast capability indicator may signify both that the entity is multicast capable, and that the entity may be included in a multicast group. The self-subscription indicator may include a notification URI that the SL may use to notify the entity of group and multicast memberships that the entity is a part of.

Figure 15:
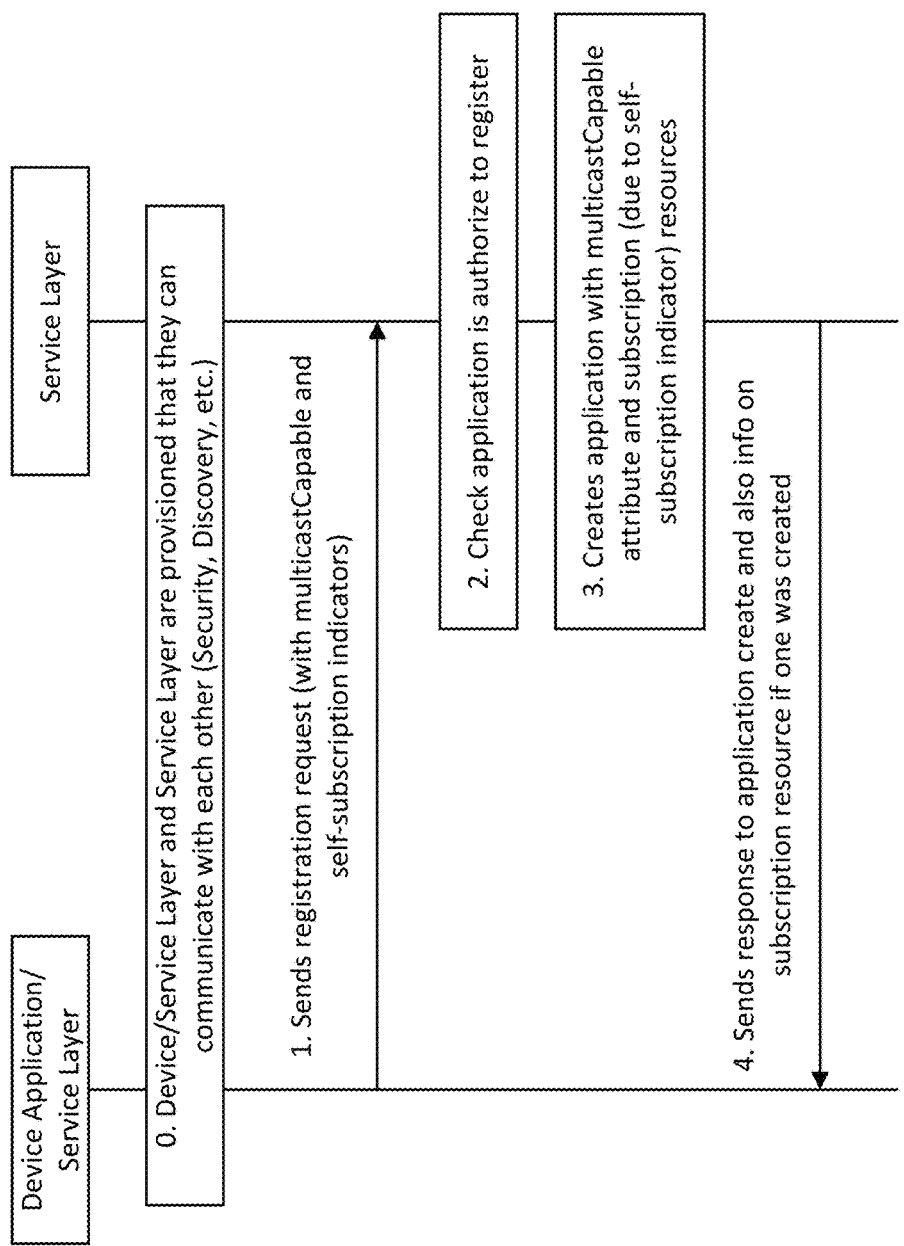
FIG. 15 shows an example call flow in which an SL creates a subscription resource.

FIG. 15 shows an example call flow in which an SL creates a subscription resource implicitly based on a self-subscription indicator provided by an application or another SL in an SL registration request. The entity also provides a multicast capable indicator.

In step 0, a device and a service layer are properly bootstrapped such that they may communicate with each other, which includes among other things security provisioning and service discovery procedure.

In step 1, a device application (or another service layer) sends a registration request. The request indicates that the application is multicast capable. The request also includes a self-subscription indicator and a notification URI. In addition to the multicast capable attribute, the registration message may include the types of multicast messaging that the entity is capable of receiving. Examples of types of multicast messaging are MBMS, Cell Broadcast, IP Multicast, etc. Additionally, a network indicator may accompany each type of messaging method. The network indicator may indicate a type of network (e.g., 3GPP/Cellular) or a network name (e.g., PLMN name) that may be used with each messaging method. Additionally, if the entity is already associated with a group, or if the entity is hosted on a device that is already associated with a group, the registration message may also include the group name.

In step 2, upon receiving the registration request, the service layer checks the authorization policy to see if the entity is allowed to register. If allowed, the SL continues to step 3. If not, the SL goes to step 4.

In step 3, if the request contains all the information required to create an application resource, the SL creates the resource with multicast-capable meta-data. In addition, if the entity includes a self-subscription indicator, the SL also creates a subscription resource for the application, with the associated notification URI if one was provided. If a notification URI was not provided, the SL may specify a URI of its choosing and include it in the response sent in step 4. The notification URI in the "self" subscription resource may be used later by the SL to notify the device application/SL of its inclusion in a multicast group.

In step 4, the SL sends a response based on the results of the registration request, including any information on the subscription resource if one was created.

Figure 16:
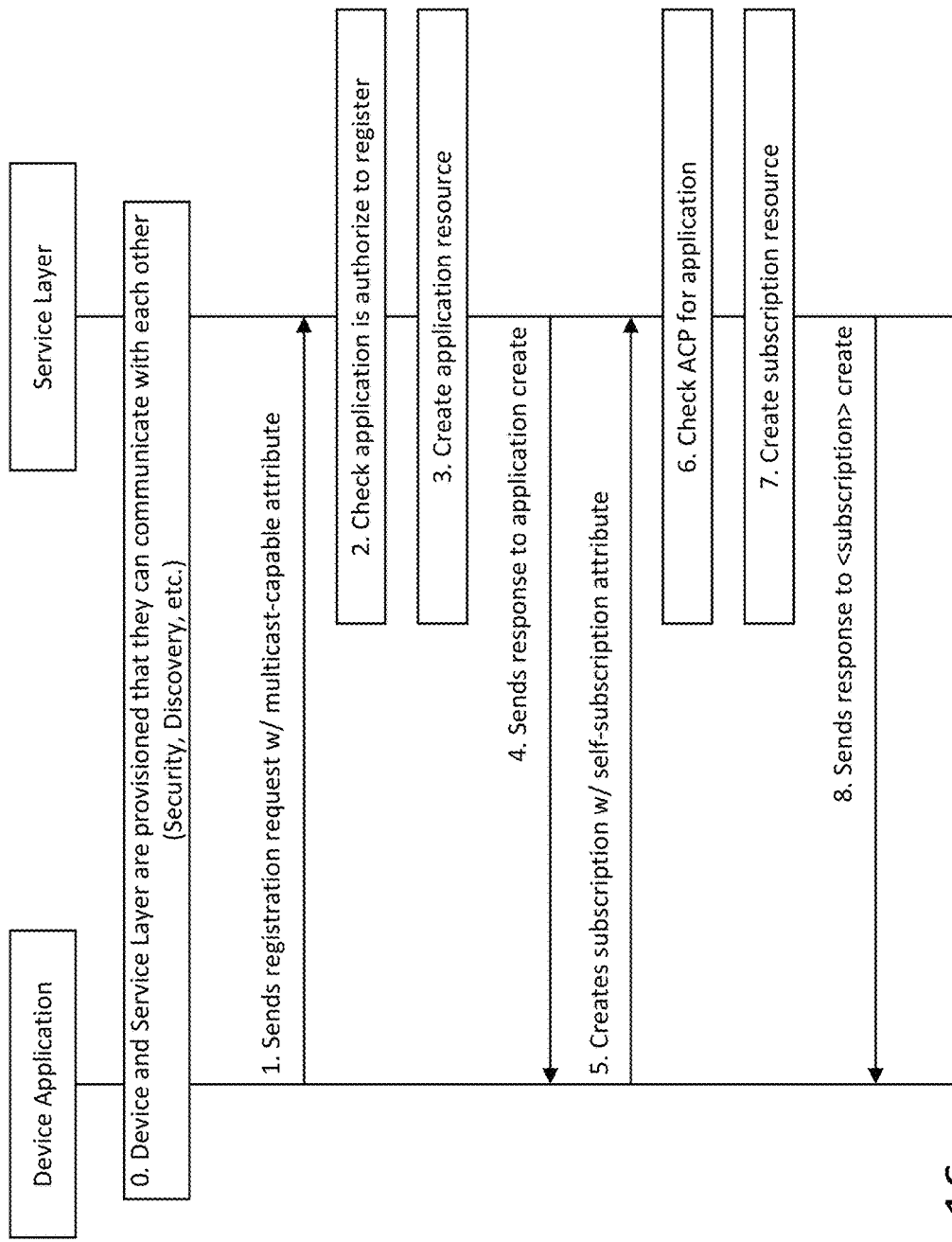
FIG. 16 shows an example alternative call flow in which an SL creates a subscription resource.

As an alternative to the SL implicitly creating the subscription resource, the device application/SL may also explicitly create the subscription in a separate request as shown in the example of FIG. 16. The entity may include a new multicast-capable resource attribute in the registration request to indicate it is multicast capable. Then it may explicitly create the subscription resource and include the newly proposed self-subscription resource attribute.

In step 0 of FIG. 16, the entity and SL are properly bootstrapped such that they may communicate with each other. This includes among other things security provisioning and service discovery.

In step 1, the entity sends a registration request with a multicastCapable resource attribute.

In step 2, upon receiving the registration request, the SL checks the authorization policy to see if the entity is allowed to register. If allowed, the SL goes to step 3; if not, the SL goes to step 4.

In step 3, the SL creates the application resource and sets the multicastCapable resource attribute. This attribute enables the SL to autonomously determine if a device supports multicast and whether it may be part of a multicast group.

In step 4, the SL sends a response to the registration request based on the results of processing the request.

In step 5, the entity creates a subscription under its application resource, including the self-subscription attribute with the appropriate notification URI.

In step 6, the SL checks the access control policy of the entity to ensure it may create a self-subscription. If access is granted, the SL goes to step 7, else it goes to step 8.

In step 7, the SL creates the <subscription> resource and includes the self-subscription resource attribute. In step 8, the SL sends an appropriate response of the subscription create to the entity.

The self-subscription attribute enhances SL subscription functionality by allowing the SL to communicate to the subscribing entity in an unsolicited manner. The self-subscription indicates that any request targeting one of the device application's resources on the SL that requires some action by the device application may be sent to the device application. This is different from traditional subscription behavior, where the subscription applies to changes in the parent resource only.

Self-subscription functionality may be used in other ways. For example, the SL may need to get approval from the entity for granting access control privileges to a third party application. Here, as with multicasting, requests may be triggered by requests initiated by third party applications, or even by service layers on resources belonging to the entity, that require communication with the entity for efficient resolution.

Another use of self-subscription is in native service layer device management where a service layer may want to send management commands to an end device. Upon registration, a device may create device management resources within the service layer. Self-subscription functionality may then be used to request that the service layer notify the device if there are external requests to perform management functions on the device. When a third party requests a management action be performed on the device, the self-subscription functionality will trigger and the service layer will send a notification to the device with the contents of the management function.

A service layer netConfig resource may be used to enable configuration of multicast capabilities within underlying networks by providing network configuration parameters for use in creating multicast groups. The netConfig resource may also be used for overall configuration of network parameters. Some example parameters for a netConfig resource are provided in Table 5 of the Appendix. The netConfig resource may be a child resource of an existing SL resource, such as oneM2M's [areaNwkInfo] and [areaNwkDeviceInfo] management objects. Alternatively netConfig may be its own, standalone SL resource. The netConfig resource ay carry the network parameters of the underlying network technology, and its attributes depend on the network type, e.g., IP, cellular, Bluetooth, etc.

A netConfig resource may be used in providing network parameters of a registered device's local network interface used for communications. Alternatively, a netConfig resource may be used for specifying network parameters in multicast group configuration. Device applications will typically create a local netConfig resource and may also create a multicast netConfig resource. Managing applications may initiate the creation of both device local and multicast netConfig resources. SLs may initiate creation of a multicast netConfig resource.

After an entity successfully registers with the SL, network resources may be created and provided with such information as area network type, list of devices within the area network, a list of neighbor nodes, and any sleep state the device may have. This information is found in SL resources such as oneM2M's [areaNwkInfo] and [areaNwkDeviceInfo].

Additional network parameters, which enable the SL to make more intelligent use of the underlying network resources, may be provided by creating one or more netConfig resources. These netConfig resources may be associated with network interfaces the devices support for communications, such as Ethernet and WiFi interfaces. Table 5 of the Appendix shows some network parameters for different network access technologies that are not completely specified in a standard service layer but may be included in new netConfig resources. Multiple netConfig resource instances may be used, for example, where a device supports multiple network access technologies, the device is multi-homed, or the SL wishes to create multiple multicast groups. The contents of the resource will depend on the network type as specified by [areaNwkInfo], or specified as an attribute within netConfig when there is no parent network resource.

A netConfig resource may be created by a device application or by a managing application. The information provided in a netConfig resource includes network parameters of the device. These may be device-specific network configurations, such as IP address and domain name, that are used by the device to communicate. In addition, the ProtocolsSupported parameter gives an indication of which protocols the device application understands, and may be used to provide the SL knowledge of how to communicate to the device. The SL may use this list to identify a preferred protocol binding (e.g., HTTP, CoAP) to use when communicating to the device. For example, the MTU is the maximum size message the device may process. When used in conjunction with CoAP, this could determine the block size used. Finally, the presence of MLD in Protocols Supported and a Default Gateway may indicate the device is able to send MLD Reports to the gateway and the SL may send the gateway a multicast message, which will be forwarded by the gateway.

The netConfig resource may also be used to configure the parameters of a multicast group. Multiple multicast groups may be created for different operations with a netConfig resource for each group. For example, an SL gateway may have different netConfig resources for each multicast groups it manages: one for downloading firmware, one for retrieving information, another one for retrieving different information, and a fourth one for updating information.

Once the SL has received multicast capability indications from registering entities, and the service layer netConfig resource has been created, the service layer (and managing applications) may perform SL group operations. The SL may form a multicast group using information from the netConfig and group resources. During the creation of an SL group resource, the members of the group are specified. Where the SL autonomously creates SL multicast groups, it may check which members in the group support multicast capability, and which other devices in the same area network may be reached via each multicast capable device. If a member of the group supports multicast and there are other group members in the same area network, there is a good probability that a multicast group could be created. For example, the SL may use the Default Gateway parameter of the netConfig resource to determine devices belonging to the same local area network. Upon determining a multicast group may be created, the SL then creates a netConfig resource.

The SL may provide the URI of the netConfig resource as a new attribute multicastIDs within the group resource and return it to the requestor in the response. The multicastIDs attribute may contain more than one multicast group and consist of a list of URIs that point to one or more netConfig resources. If the group resource contains members residing on separate networks, multiple multicast groups may be created. For example, if some members of a group are managed by a particular gateway while other members are managed by a 3GPP core network, two multicast groups could be created for the same SL group.

Figure 17:
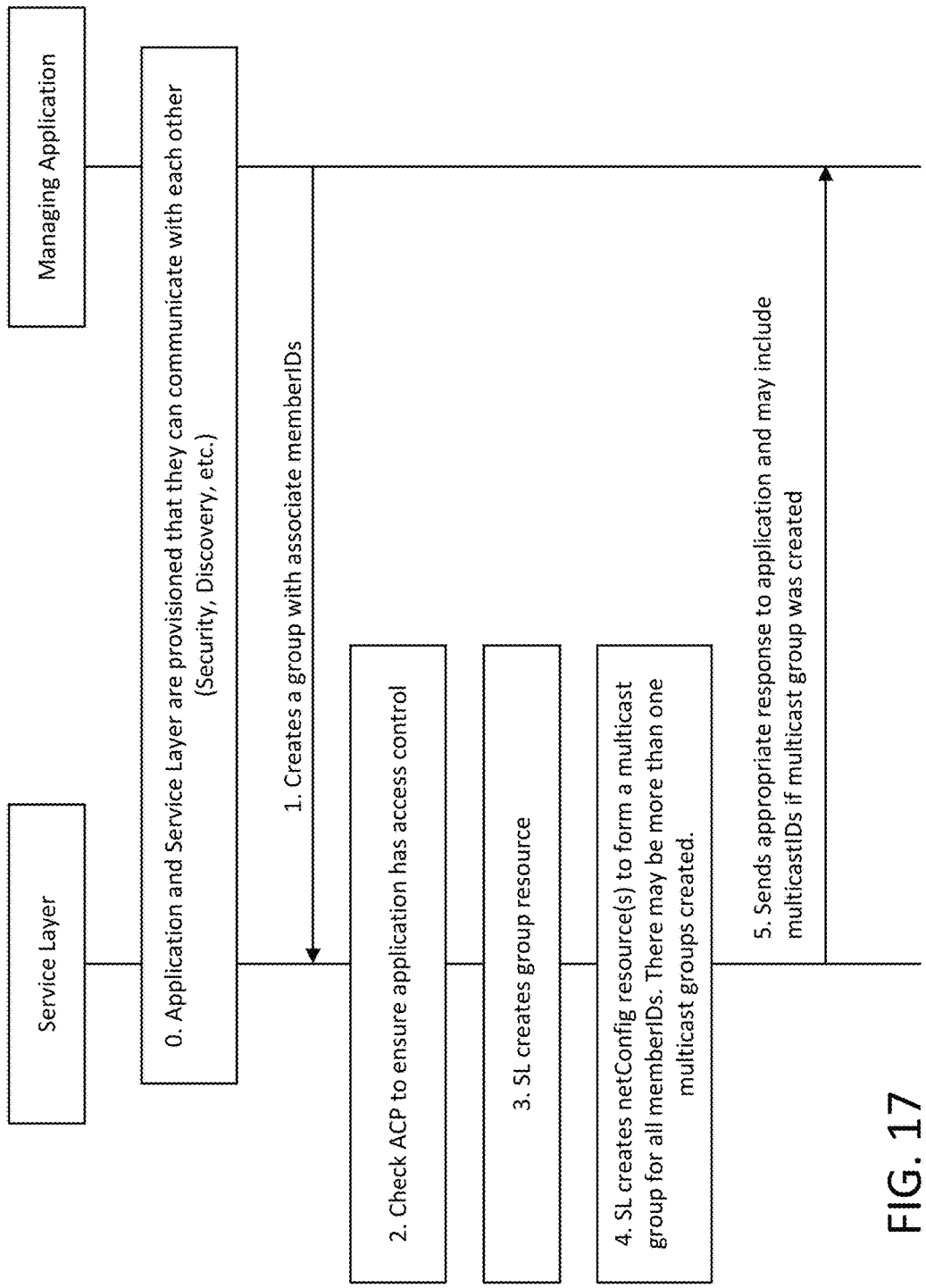
FIG. 17 shows an example call flow in which the service layer creates multicast groups.

FIG. 17 shows an example call flow in which an SL autonomously creates multicast groups from a group resource create request. In step 0, the managing application and service layer are properly bootstrapped such that they may communicate with each other. This includes, among other things, security provisioning and service discovery. In addition in this step, device applications (not shown) have provided the SL information such as multicast capability, self-subscription URI, and network parameters.

In step 1, a managing application requests to create a group resource within the SL for the device applications, where the device applications are associated with memberIDs.

In step 2, the SL checks that the application has access privileges to create the group resource. If access is granted, the SL goes to step 3, and otherwise goes to step 5.

In step 3, the SL processes the request and determines whether a group resource should be created based on the provided information. The SL examines the memberIDs and checks whether each member is multicast capable. If multiple members are multicast capable, and they all reside on the same local area network, the SL may then create a multicast group. If a multicast group is created, the SL goes to step 4, and otherwise goes to step 5. There may be cases where a multicast group cannot be created, such as when the devices do not support multicast or are not located in the same area network. In these cases, the SL may default to sending unicast messages. There may also be cases where both multicast and unicast messages are sent, where a portion of members support multicast but other members do not. The SL may further determine to make more than one multicast group, to address the situation where multiple devices are located in each of separate local networks.

In step 4, the SL forms one or more multicast group based on the determination made in step 3. The SL creates a netConfig resource for each multicast group. The group resource may consist of members from two different local area networks and as a result, two multicast groups could be created. The multicast address may be some well-known multicast address such as all-nodes or all-COAP-node multicast addresses. Alternatively, the multicast address may be based on some SL policy or configuration.

In step 5, the SL sends a response to the application based on the result of processing the request, and may optionally include the multicastIDs attribute. The managing application may use the information provided by the multicastIDs to determine whether multicast was enabled, and if it was, where to find the multicast configuration. This allows the managing application to change the multicast address in the future.

Figure 18:
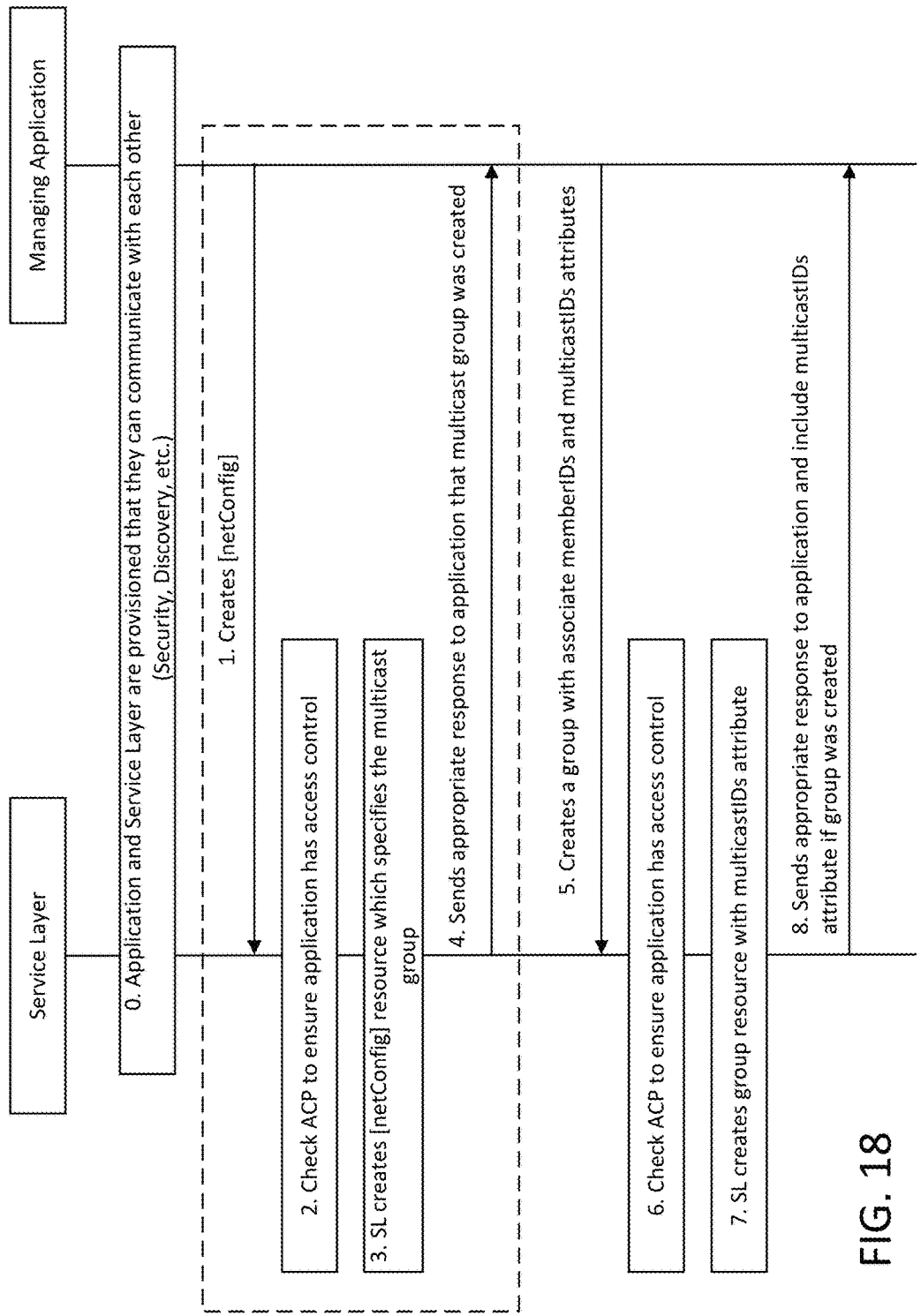
FIG. 18 shows an example alternative call flow in which a managing application creates a netConfig resource.

FIG. 18 is an example alternative call flow in which a managing application creates a netConfig resource. The netConfig resource may be created by a managing application that has knowledge of the area network and knowledge of how multicast would be used in the system. In this case, the managing application may be provisioned with the details of the multicast group and create the netConfig proactively instead of letting the SL create it.

In step 0, the managing application and service layer are properly bootstrapped such that they may communicate with each other. This includes, among other things, security provisioning and service discovery procedure. In this scenario, the managing application has knowledge of the multicast system and about the device's operations.

In step 1, a managing application requests to create a netConfig resource based on information that were pre-provisioned for the multicast network. This may be performed by a network administrator configuring the multicast network. It could also be performed by a service provider to serve its customers through multicasting its content.

In step 2, the SL checks that the application has access privileges to create the netConfig resource. If access is granted, the SL goes to step 3. Otherwise it goes to step 4.

In step 3, the SL creates a netConfig resource if the provided information is valid.

In step 4, SL sends a response to the managing application based on the results of processing. The response includes multicastIDs with the URIs of the netConfig resource in the case of a successful creation of the netConfig resource. Steps 1 to 4 may be repeated to create multiple [netConfig] resources, each for different multicast addresses.

In step 5, the managing application then requests to create a group resource with the associated memberIDs and multicastIDs attributes.

In step 6, the SL checks that the application has access privileges to create the group resource. If access is granted, the SL goes to step 7, and otherwise goes to step 8.

In step 7, the SL creates the group resource with the multicastIDs attribute. In step 8, the SL sends an appropriate response to the application with the multicastIDs attribute.

Figure 19:
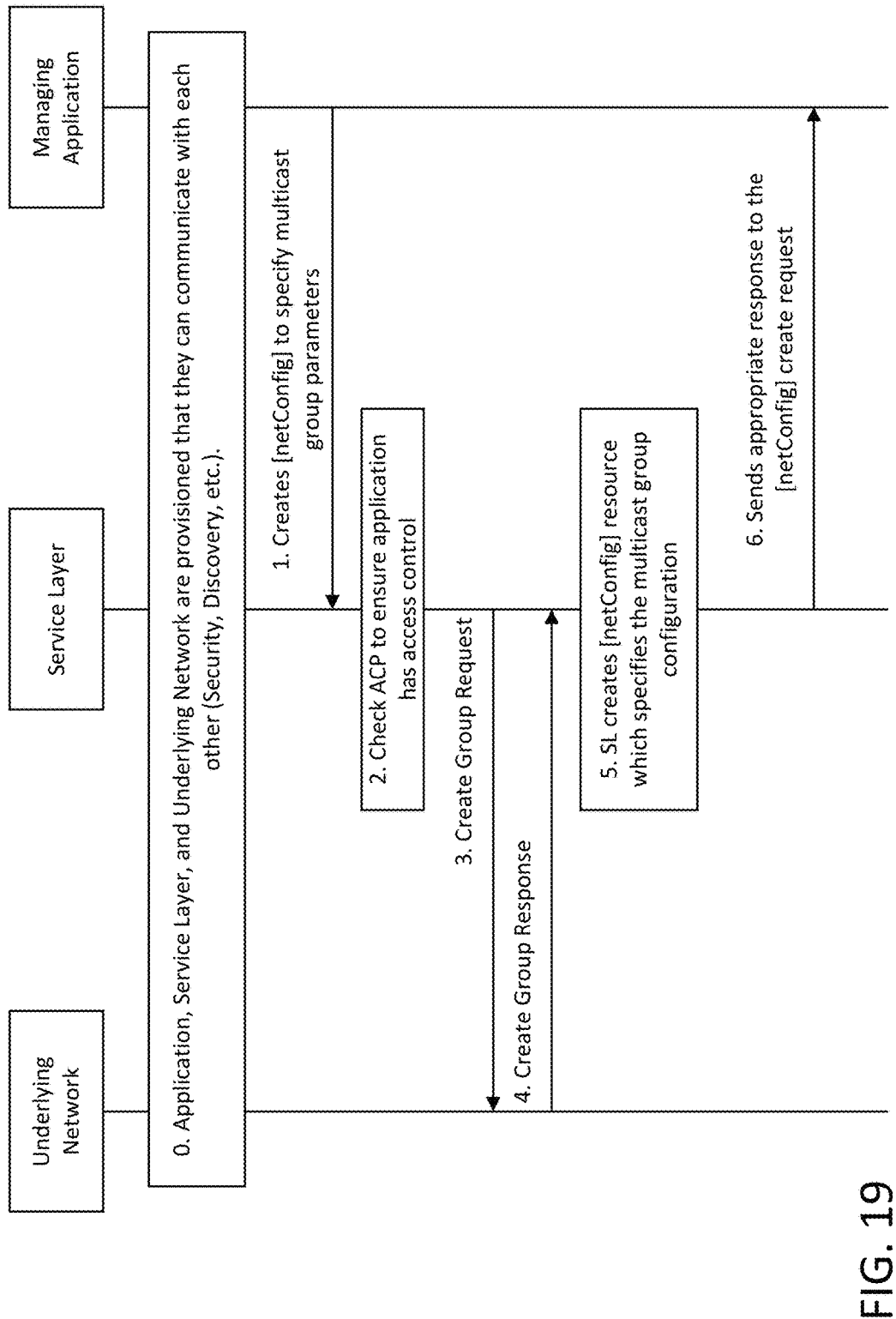
FIG. 19 shows an example call flow in which a managing application triggers the creation of a multicast group in an underlying network.

FIG. 19 shows an example method by which a managing application creates a netConfig resource to trigger the creation of a multicast group in the underlying network. The netConfig resource in this case applies to the setup of a 3GPP multicast group as shown in FIGS. 10 and 11. If the 3GPP parameters are known by the managing application via provisioning, they could be provided as parameters in the netConfig resource. In step 0, the managing application, SL, and underlying network are properly bootstrapped such that they may communicate with each other, which includes among other things security provisioning and service discovery procedure. The underlying network in this case is a 3GPP network and the SL communicates specifically to the SCEF.

In step 1, the managing application creates a netConfig resource with some 3GPP identifiers provisioned to it. This netConfig resource create request will trigger the SL to make a request to the SCEF to create a multicast group.

In step 2, the SL checks that the application has access privileges to create the netConfig resource, and if access is granted, goes to step 3. Otherwise it goes to step 6.

In step 3, the SL sends a 3GPP Create Group Request to the SCEF. The create group request may include: identifiers of the devices that will belong to the group (e.g., 3GPP External or Internal Device ID's); a requested 3GPP External Group ID name; a Group Duration that indicates how long the group should exist before it may be automatically purged from the network; and an APN that will be used to communicate with the group.

In step 4, the SCEF returns the 3GPP Create Group Response. The create group response may include: the assigned 3GPP External Group ID name, such as a URI or TMGI; the assigned group duration; an assigned APN if no APN was provided in step 3 or if the APN is assigned by the SCEF or Mobile Core Network; and an EBI that may be used to send the group message.

In step 5, the SL creates the netConfig resource with the 3GPP External Group ID name and the other attributes provided by the application. In step 6, the SL returns an appropriate response to the netConfig create request.

The multicast group created via the netConfig resource provides only the network parameters for executing the multicasting of a message. It does not include the list of members, which is provided by the SL's group resource. Therefore, adding or removing group members is performed using existing SL group requests. However, the SL may still check if removing a member removes a multicast group, e.g., if there are no members in a multicast group. The removal of a netConfig resource may also be done by a managing application. Similarly, adding new members may result in creating new netConfig resources for one or more new multicast group(s).

There may be more than one multicast group created for a particular SL group resource. This may be the case when the members of the SL group reside in different local area networks or if certain members reside in a cellular network while other members reside in a different cellular network. When this occurs, multiple netConfig resources are created and the multicastIDs attribute of the SL group resource includes the URI of each netConfig resources. Additionally, the same netConfig resource may be used in multiple SL group resources, e.g., the multicast group is applied to different SL fan-out operations.

SL multicast group creation may be followed by notifications, such as multicast group configuration notifications and multicast endpoint notifications. Such notifications may indicate the creation of new netConfig resources. Multicast group configuration notification may carry network parameters regarding how the multicast group is created and sent to entities that configure the network parameters in the underlying network or in other SLs. Multicast endpoint notifications may be unicasted to members of the multicast group, and contain: network parameters; the contents of the SL group request, which includes the target and resource URIs; and a payload if the operation is Create or Update.

This notification method is dynamically executed based on the state of the netConfig and SL group resources. Whenever a netConfig resource is created or updated, a notification may need to be sent if the resource applies to external entities such as another SL or some underlying network. In addition, if a multicast group is created based on the netConfig and SL group resources, device applications may need to be notified. If a new member is added by a managing application to an existing group which supports multicast, that new member should be notified of the multicast group it is a part of Additionally, if the multicast address is changed in the netConfig resource, all members of the group may need to be notified of this change.

Once the SL has created the multicast group, it needs to notify the devices involved, including any entity that assists in carrying out the multicast operations, such as other SLs and underlying networks. In the case of devices, the SL may use the self-subscription notification URI to send an unsolicited request with information about the multicast group the SL created, including information such as the multicast address, time the multicast request will be made if it is scheduled, the resource URI on the device, the target URI of the multicast request, and a payload if it is a Create or Update operation. The target URI and the resource URI may be different. The target URI is created by the SL and is used in the subsequent multicast message. The resource URI is derived from the member IDs of the group resource and applies to the resource within the device. This mechanism provides for group retrieves in which the resource URIs on the devices are different. The target URI needs to be the same since only one multicast request is sent, as noted in RFC 7390. The device application will then know to interpret the target URI of the multicast message as the resource URI. The resource URI and target URI may also be the same as each other if all the resources being addressed are the same in the devices of the group.

The notification to the device applications serves two purposes. First, the notification ensures that the device is awake and listening on the appropriate multicast address. Second, for devices that supports MLD or IGMP, the notification triggers the sending of the appropriate MLD/IGMP report to instruct multicast routers to forward the multicast message. For cases where the device supports MLD, the device application sends an MLD Report after receiving the notification. In the case that the devices do not support either MLD or IGMP, the SL needs to notify the SL that manages the devices to forward the multicast message. As a result, this notification mechanism will help ensure that multicasting the message is as efficient as possible.

Figure 20:
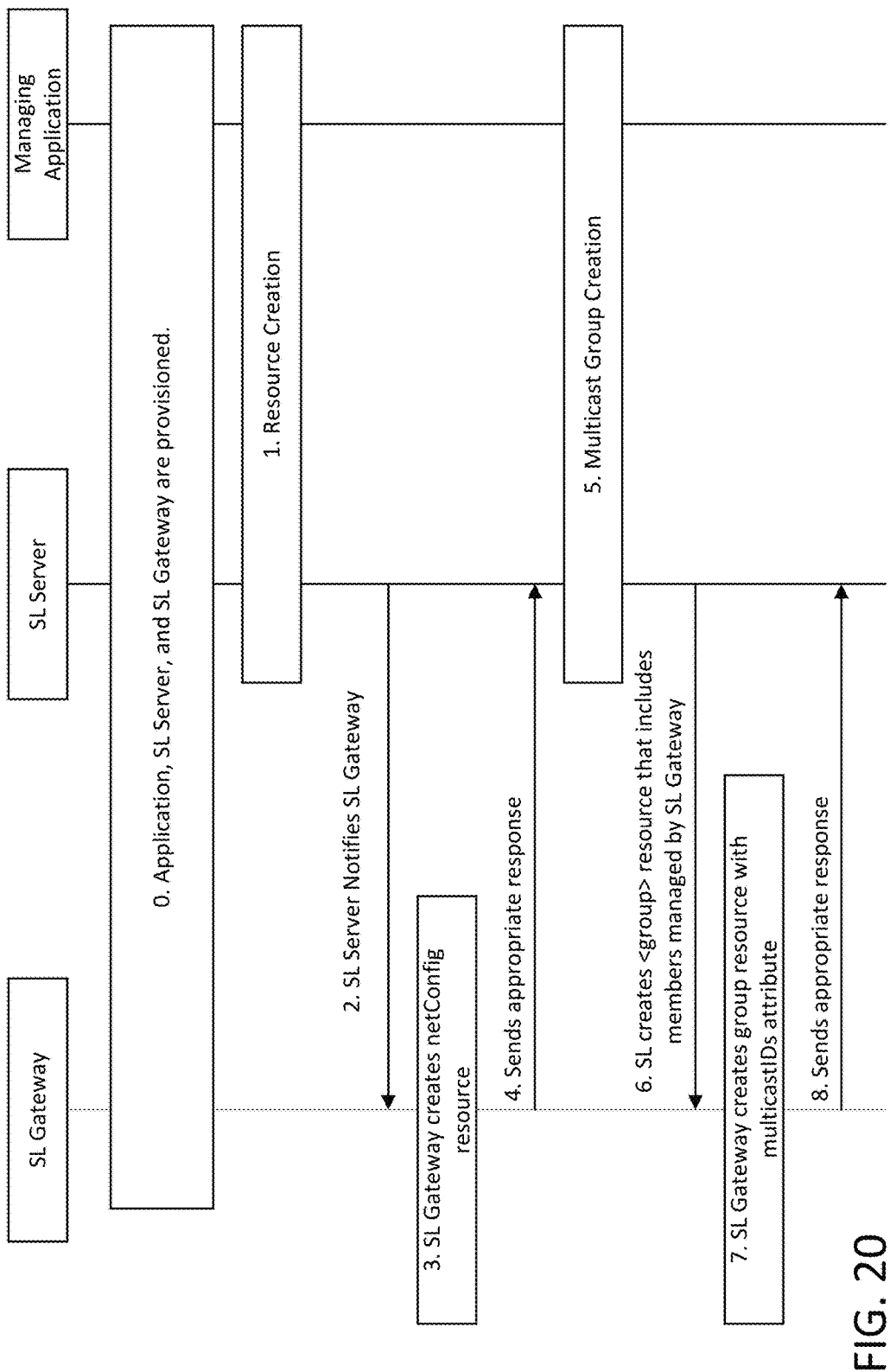
FIG. 20 shows example call flow for notifying remote service layers of the creation of a multicast group.

FIG. 20 shows example methods for notifying remote SLs of a multicast group creation. In FIG. 20, the gateway is registered with the SL server, and appropriate management resources have been created on the SL server. In oneM2M, these resources may include <node> and <areaNwkInfo> resources. The managing application creates a netConfig resource on the SL server with the multicast group configuration parameters. The SL server in turn notifies the gateway by creating a netConfig resource. In addition, the managing application creates a group resource in which some of the members are managed by the SL gateway and others are managed by a second SL gateway (not shown). This request also triggers the SL server to create a group resource on the SL gateways which only includes members the gateway manages.

In step 0, the managing application, SL server, and SL gateway are provisioned to communicate with each other. The SL gateway is registered to the SL server and appropriate network resources are created. Devices connected to the SL gateway are configured for multicast operations. A managing application first creates a netConfig resource to provide multicast address and network parameters to use for multicasting. Then it creates a group resource in which some members are managed by the SL gateway.

Additional members are managed by another gateway (not shown). Steps 2 to 4 and steps 6 to 8 are executed for the two gateways. The netConfig resource created on each gateway may contain the same information since they are on separate local area networks. However, the contents of the group resource created on each gateway may be different due to having different group members.

In step 1, the service layer receives a request to create a netConfig from the managing application. The service layer checks the access control privileges of the managing application before creating the resource, and notifies the managing application of the results of this processing, as described in reference to steps 1-4 of FIG. 18. Alternatively, in step 1 of FIG. 20, the managing application and service layer may execute steps 1-6 of FIG. 19. The multicast network parameters are provided in the netConfig resource. More than one netConfig resource may be created to support multiple multicast groups, as required.

Referring again to FIG. 20, in step 2, after creating the netConfig resource, the SL server notifies the SL gateway that it will send it multicast messages by creating a corresponding netConfig resource on the SL gateway. The contents of the netConfig resource reflects the information provided by the managing application.

In step 3, the SL gateway creates a netConfig resource locally.

In step 4, The SL gateway sends an appropriate response to the SL server indicating success.

In step 5 the managing application creates a group in which the members are located in two different gateways, e.g., in accordance with the methods described in reference to steps 5 to 8 of FIG. 18. The SL server makes a determination that the group created may be optimized into two multicast groups serviced by two gateways by utilizing information provided by each gateway via the multicastCapable indicator during the SL registration. Each gateway provides a success response to the creation of the netConfig resource. If the response was not successful, then the SL server cannot use multicast on the SL gateways.

In step 6 of FIG. 20, the SL server creates a group resource on each SL gateway with only the members that each gateway manages. In step 7, each SL gateway creates a group resource and sets the multicastIDs attribute to point to the URI of its own netConfig resource. In step 8, the SL gateway returns an appropriate response to the SL server.

Figure 21:
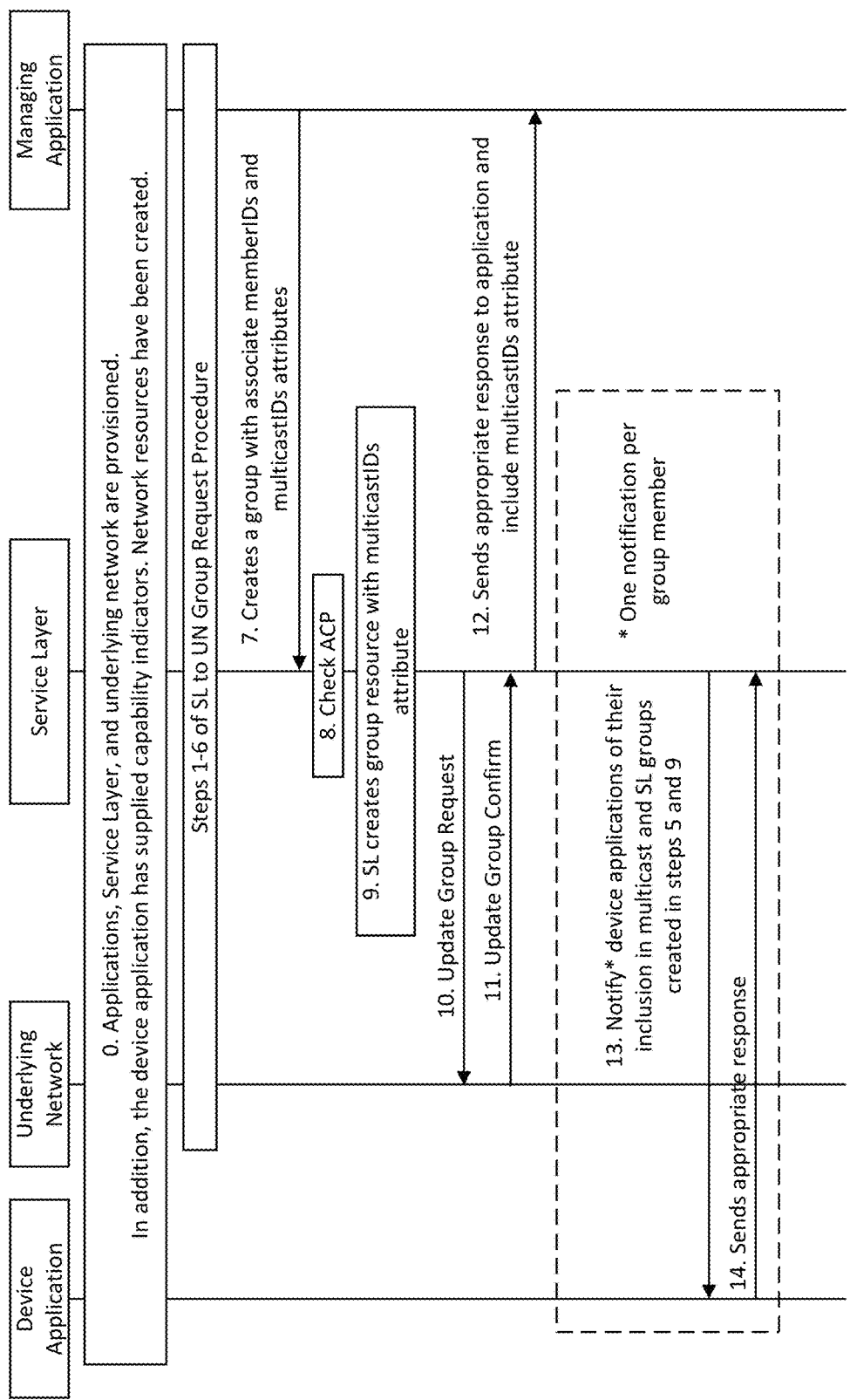
FIG. 21 shows an example call flow wherein a service layer updates the underlying network regarding changes to a multicast group.

FIG. 21 shows an example case wherein an SL updates the underlying network regarding changes to a multicast group, such as the multicast group created by the method described in reference to FIG. 19. In the example of FIG. 19, when the multicast group was configured, the SL did not have information regarding the members of the group. When the SL group resource is created in step 9, the SL notifies the underlying network of the change by performing an Update Group Request. In addition, the device applications need to be notified. This notification differs from the multicast group configuration notification as it includes not only network parameters but also information on the content of the multicast message, e.g., what application content is being requested.

Referring again to FIG. 21, in step 0, the managing application, service layer, underlying network, and device applications are properly bootstrapped such that they may communicate with each other, which includes among other things security provisioning and service discovery procedure. In the example of FIG. 21, the managing application has knowledge of the multicast system and about the device's operations. The underlying network in this case is a 3GPP network and the SL communicates specifically to the SCEF.

Steps 1 to 6 of FIG. 21 are the same as steps 1 to 6 of FIG. 19. Here in FIG. 21, when the SL made the Create Group Request, it did not know of the members of the group. It only configured the network parameters for the multicast group.

In step 7, the managing application creates an SL group resource with associated memberIDs and multicastIDs attributes. The multicastIDs attribute contains the URI of the netConfig resource created within steps 1 to 6.

In step 8, the SL checks that the application has access privileges to create the group resource. If access is granted, the SL goes to step 9; else it goes to step 12.

In step 9, SL creates the group resource with the memberIDs and multicastIDs attributes. The URIs in the multicastIDs attribute point to one or more netConfig resources, which provide the network parameters for the multicast group. With the combination of these two resources, the SL may create SL multicast groups dynamically. As a result, it does not have to create another resource for the multicast group. This also allows the netConfig resource to be reused. For example, the URI of a netConfig resource could be found in the multicastIDs of several SL group resources.

In step 10, the SL performs an Update Group Request to the underlying network to provide the device identifiers that will belong to the group. Previously, the SL executed the Create Group Request in steps 1 to 6. The Update Group Request updates information of the Create Group Request to include IDs of the members that is provided by the group resource create method.

In step 11, the underlying network returns the Update Group Response to the SL, which may include identifiers the SL should use for sending the multicast message.

In step 12, the SL sends a response to the managing application based on the results of its processing.

In step 13, the SL notifies each device of its inclusion in the multicast group based on the self-subscription each device created. There may be multiple notifications sent, one for each member of the group, where the notifications are unicasted to each member.

In step 14, each device returns an appropriate response to the SL. A device that is no longer interested in receiving multicast messages, or is unable to receive them, may indicate so in the response. If this occurs, the SL must ensure the device's multicastCapable attribute is disabled so that SL will send a unicast to the device message when a fan-out operation triggers.

Once netConfig and SL group resources have been configured, any SL group fan-out operation targeting the group may trigger the multicasting of the request. This relationship is important as the netConfig resource contains only the network parameters for executing the multicast, while the group resource provides the contents of the multicast message. This mechanism provides for more flexible and independent use of the two resources.

Figure 22:
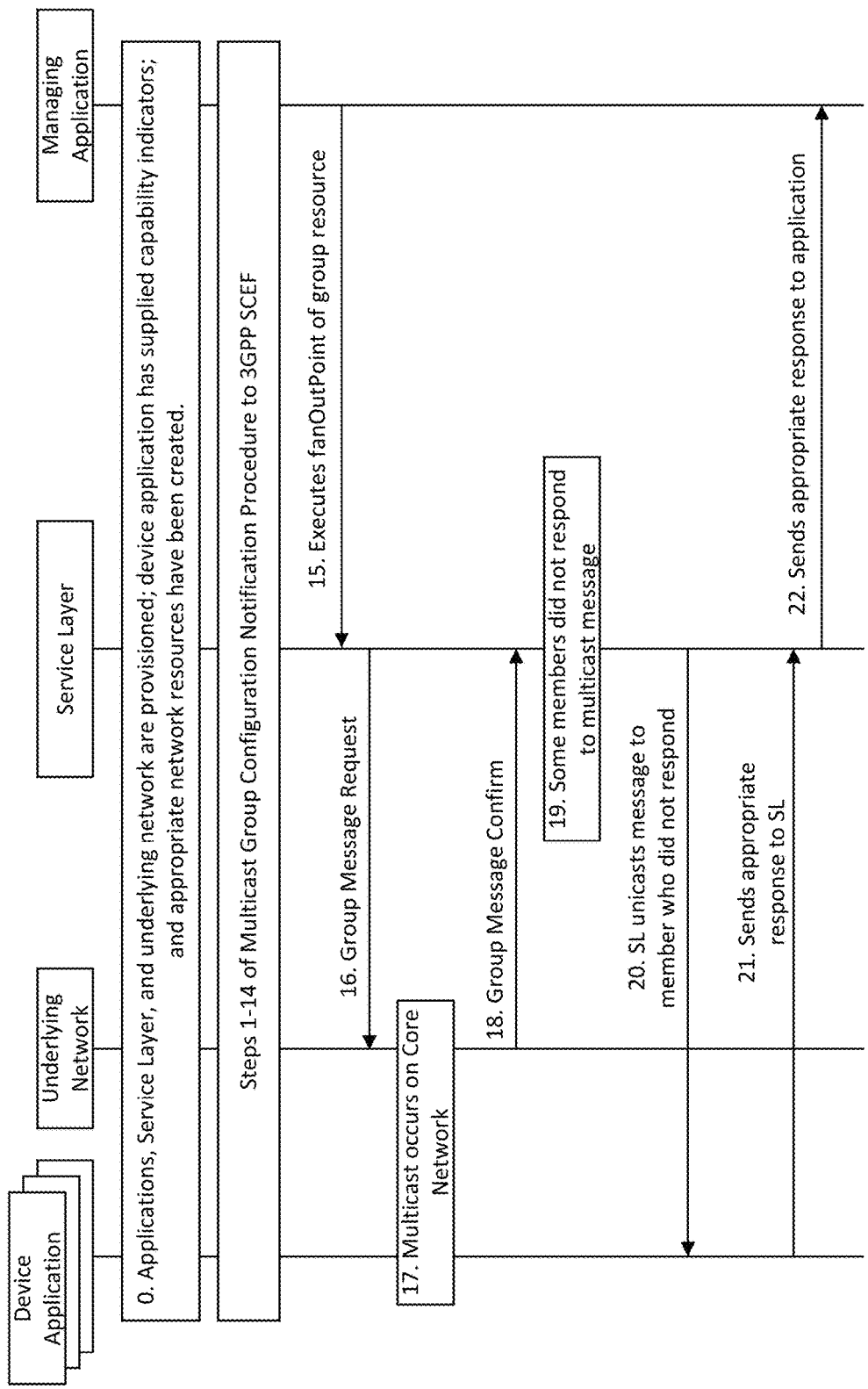
FIG. 22 shows example call flow for an SL fan-out operation.

FIG. 22 shows an example method for an SL fan-out operation to an underlying network. In step 0, the managing application, service layer, underlying network, and device applications are properly bootstrapped such that they may communicate with each other, which includes among other things security provisioning and service discovery procedure. In the example of FIG. 22, the managing application has knowledge of the multicast system and about the device's operations. The underlying network in this case is a 3GPP network, and the SL communicates specifically with the SCEF.

Steps 1 to 14 of FIG. 22 are the same as steps 1 to 14 of FIG. 21. At this point in FIG. 22, both the netConfig and group resources have been created. In addition, the members of the group as well as the underlying network have been notified.

Referring again to FIG. 22, in step 15, the managing application executes the fan-out operation on the group resource.

In step 16, the SL makes a Group Message Request to the underlying network that contains the multicast message. This message may also contain: external or internal Group ID; TMGI; APN; and EBI.

In step 17, the underlying network multicasts the message to the devices and receives responses from the devices.

In step 18, the underlying network returns the Group Message Confirm on whether the request was accepted for delivery, e.g., as described in reference to step 11 of FIG. 11. Here in FIG. 22, the response includes indications for members who did not responded to the multicast message. These indications may include the member ID and the time the multicast message was sent, for example.

In step 19, the response from step 18 indicates not all members responded to the multicast request. The SL may use the member ID and time the multicast message was send and check if the device may be sleeping or offline. If so, the SL may decide to resend the contents of the multicast message to the group member(s) identified in the response after some time. Alternatively, the SL may decide to just resend automatically to all group members who did not responded.

In step 20, as a result of step 19, the SL unicasts the contents of the multicast message to any group members who did not respond to the multicast.

In step 21, the device application sends an appropriate response to SL.

In step 22, the SL sends a response to the application. If the SL was unsuccessful in receiving a response from a group member either through multicasting and/or unicasting the message, the SL may report the member ID, the times each message were sent, and the multicast and unicast addresses. Other information such as protocols and the time the SL waited for the response may be included. In the case that there were unsuccessful attempts using multicast, the managing application may retrigger the fan-out operation in a subsequent request but indicate to the SL it does not want to use multicast in the underlying network. In such a case, the method may be repeated from step 15 onward, but steps 16 to 19 may be omitted from execution.

As part of the multicast operation, the individual devices will respond with the required information or status. However, some devices may be sleeping and will not respond to the multicast message. Since the SL has knowledge of the sleep state of these devices, it may use this information to determine whether to wait for a response from a particular device. In this case, the SL may continue aggregating the responses of the non-sleeping devices without waiting for a response from the sleeping device.

Referring again to FIG. 4, existing oneM2M CSFs may be enhanced to implement service layer self-registration of capabilities, configuration resources, multicast group creation, dynamic multicast notifications, and triggering multicast through service layer fan-out, and other methods and apparatuses described herein. For example, the oneM2M Registration CSF may be enhanced to facilitate registration of multicast capability indicators. The oneM2M Subscription and Notification CSF may be enhanced to facilitate multicast self-subscription functionality and dynamic multicast notification functionality.

The oneM2M Device Management CSF may be enhanced to accommodate the netConfig resource as a oneM2M <mgmtObj> resource for service layer configuration of multicast functionality. The Data Management and Repository CSF may also be enhanced to support storing the netConfig resource.

The oneM2M Group Management CSF may be enhanced to provide service layer group creation and multicast triggering functionality. The same applies to the Network Service Exposure/Service Ex+Triggering and the Underlying Network Service Entity (NSE) CSFs.

Figure 23:
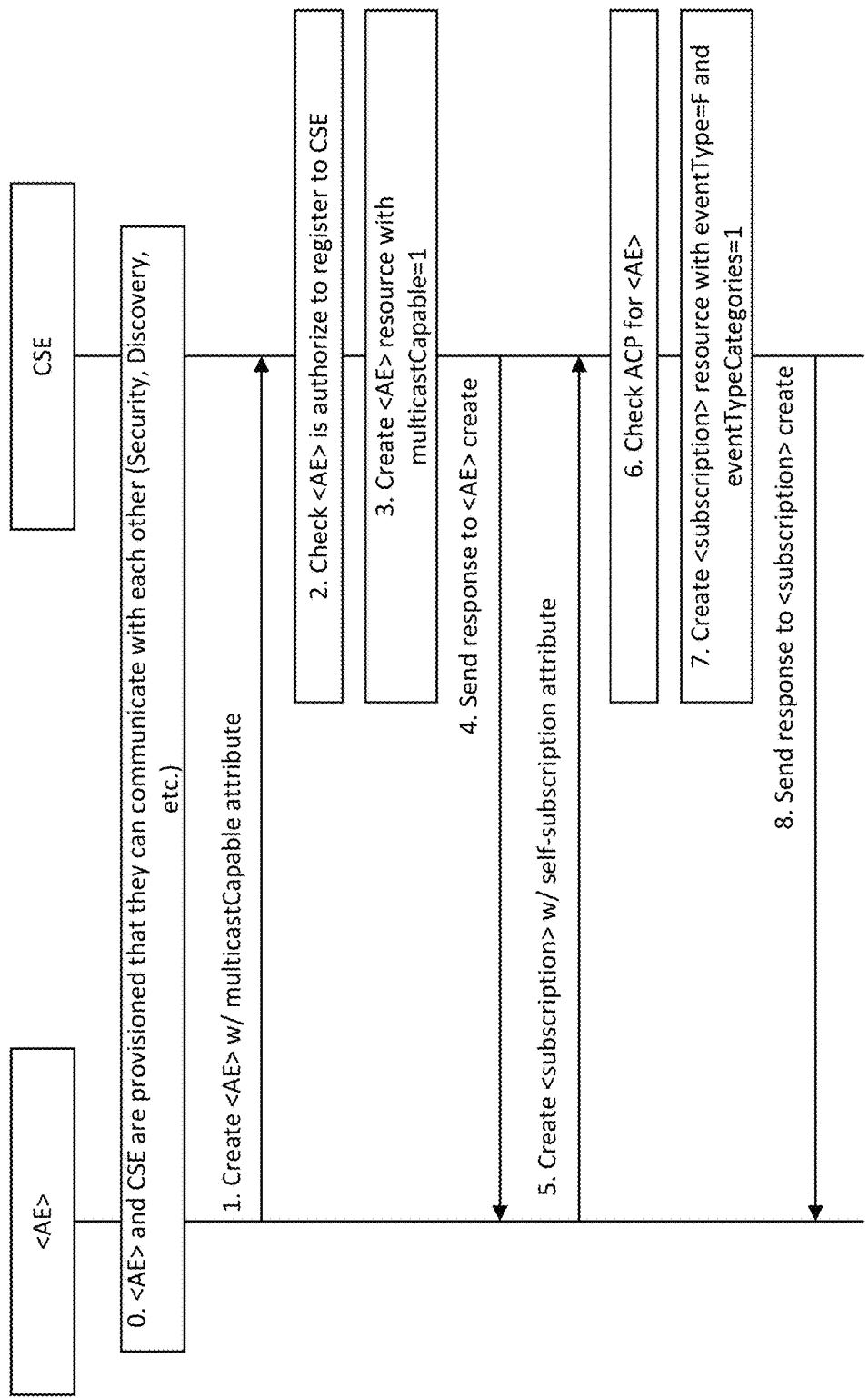
FIG. 23 shows an example call flow in which an ADN-AE registers with an MN-CSE.

FIG. 23 shows an example call flow in which an ADN-AE registers with the MN-CSE toward enabling multicast capabilities in CSE fan-out operation in a oneM2M system. Such a call flow may be used, for example, in the registration of each solar panel described in reference to the example shown in FIG. 12. Here in FIG. 23, the CSE may be an IN, MN, or ASN CSE, for example, while the device AE's may be MN, ASN or ADN AEs. The managing AE may be an IN, MN, or ASN AE, for instance.

In FIG. 23, the <AE> provides a multicastCapable attribute in the registration request. This attribute is shown in Table 6 of the Appendix along with other pertinent <AE> attributes for this use case. The multicastCapable attribute may also be added as part of the <node> resource as shown in Table 7 and gives the MN-CSE the ability to create and manage multicast groups. In addition, both the pointOfAccess and requestReachability attributes are set accordingly in the request. The pointOfAccess in combination with the requestReachability may be used to send the notification for informing the ADN-AE of its inclusion in a multicast group. Separately, the <AE> also creates a <subscription> resource with the self-subscription attribute. This attribute is represented as eventType and eventTypeCategories within the notificationCriteria attribute of the <subscription> resource. This attribute allows the CSE to notify the <AE> whenever it is included in a multicast group.

In step 0, the <AE> and CSE are properly bootstrapped such that they may communicate with each other. This includes, among other things, security provisioning and service discovery procedure. In step 1, the <AE> sends a registration request with a multicastCapable attribute, which is shown as a new attribute of the <AE> resource in Table 6 of the Appendix Alternatively, the multicastCapable attribute can be added to the <node> resource as shown in Table 7 of the Appendix. In step 2, upon receiving the registration request, the CSE checks the authorization policy to see if the <AE> is allowed to register, and if so goes to step 3, and otherwise goes to step 4.

In step 3, CSE creates the <AE> resource and sets the multicastCapable attribute. In step 4, the CSE sends an appropriate response to the registration request. In step 5, <AE> creates a <subscription> under its <AE> resource and includes the self-subscription attribute with the appropriate notificationURI. In this case, eventType=F and eventTypeCategories=1 . Examples of eventTypeCategories definitions are shown in Table 8 of the Appendix. In step 6, the CSE checks the access control policy of the <AE>. If access is granted, it goes to step 7, else goes to step 8.

In step 7, CSE creates the <subscription> resource and includes the self-subscription value as the newly defined eventType and eventTypeCategories of the notificationCriteria attribute as shown in Table 9 of the Appendix. In step 8, the CSE sends an appropriate response of the <subscription> create to the <AE>.

In the <subscription> resource, the CSE sets the eventType to a new value "F" as shown in Table 9 of the Appendix. This event type is used when the CSE needs to send an unsolicited request to the subscriber due to some activity in the CSE that requires the subscriber's attention.

For example, the CSE informs the subscriber it is part of a multicast group or the CSE needs the subscriber's approval for access control. These unsolicited requests are triggered by other requests in the CSE, e.g., when a <group> is created or when a third party application wants to get access to the subscriber's resource.

Associated with the eventType is a policy that describes what events the subscription would trigger a notification for. This policy allows the subscription creator to specify for which types of events it wants to be notified. The policy may be realized by adding a new attribute to the <subscription> resource called eventTypeCategories as shown in Table 8 of the Appendix. Alternatively, the policy may be linked to a CMDH policy, such as the requestContext attribute of the [cmdhDefEcValue] resource.

After the <AE> and <subscription> resources are created successfully, the ADN-AE creates the <node> and [areaNwkDeviceInfo] resources to provide the MN-CSE information on the device's sleep states and any known neighbors. The AE's nodeLink attribute is updated during this process to associate the AE to the [areaNwkDeviceInfo] resource. Other solar panels follow the same procedure to register with the MN-CSE.

To enable the control of the motorized mounts, the solar panel ADN-AE creates two device capability management objects [rotateCap] and [tiltCap]. These <mgmtObj> resources control the radial rotation and vertical tilt of the mounts respectively. Each solar panel will create these resources under their associate <node> resource, which is the parent resource of all <mgmtObj> resources for a particular device.

Within the MN-CSE, an [areaNwkInfo] resource was configured during deployment to provide information about the area network the CSE manages. As each solar panel ADN-AE successfully registers, the listOfDevices attribute of the [areaNwkInfo] resource is updated to show all the devices connected to this network. Since the [areaNwkInfo] is a <mgmtObj> resource, it may be dynamically updated or on some periodic interval as determined by a CSE policy. Later on, this information will be used by the CSE to assist in determining whether to create a multicast group.

Once the solar panel ADN-AEs have registered with the service layer, and the resources are created, the CSE has enough information to create multicast groups. A managing AE may then create four <group> resources with all the solar panels ADN-AEs as members, where the groups are, for example: <rotateRight>, <rotateLeft>, <tiltUp>, and <tiltDown>. The "rotate*" groups target the [rotateCap] resource which rotates the panels horizontally while the "tilt*" groups target the [tiltCap] resource to tilt the panels vertically.

Upon the creation of each group resource, the MN-CSE checks the memberIDs attribute to identify all the members of the group. Then the MN-CSE checks whether each member has the multicastCapable attribute to indicate it supports multicast. Additionally, the CSE may obtain network parameters from an [areaNwkDeviceInfo] resource as well to identify the neighbors of each member. Finally, it creates a [netConfig] resource used for multicast under the [areaNwkInfo] resource for the multicast group it created to include all members that support multicast.

An alternative method the CSE may use for making a determination of creating a multicast group is to use the [netConfig] resource associated with each ADN-AE's local network interface. In this method, a defaultGateway attribute of each ADN-AE may be compared and if they all match, the CSE may conclude they are all being serviced by the same gateway. As a further check, the CSE may verify each ADN-AE's neighbor list attribute found in the [areaNwkDeviceInfo] resource to ensure it is the same local area network.

The [netConfig] resource contains a multicast IP based on some policy or configuration in the CSE and a target URI, which is the same in this case as all the ADN-AEs have the same functionalities. The CSE then updates the multicastIDs attribute of the <group> resource with the URI of the [netConfig] resource. A oneM2M embodiment for the multicastIDs attribute is shown in Table 10 of the Appendix. In addition to providing a link between the [netConfig] and <group> resources, the multicastIDs attribute allows the managing AE to see if a multicast group was created and to find what multicast address was used. Alternatively, a managing AE may create the [netConfig] resource explicitly before creating the group resource and provide the [netConfig] URI in the multicastIDs attribute of each <group> resource.

Once the multicast and CSE groups have been created, the CSE notifies each member in the group through the self-subscription mechanism. Table 11 of the Appendix shows elements of the notification message that the CSE may send to either the SCEF or the device applications. The CSE sends the network parameters in [netConfig] and the resource URI from the CSE <group> resource to each solar panel. The target URI in this case could be "/rotateRight", which appears in the multicast message. For this case, the resource URI is also "/rotateRight". Each solar panel receives the notification and notes the URIs and the multicast address.

Figure 24:
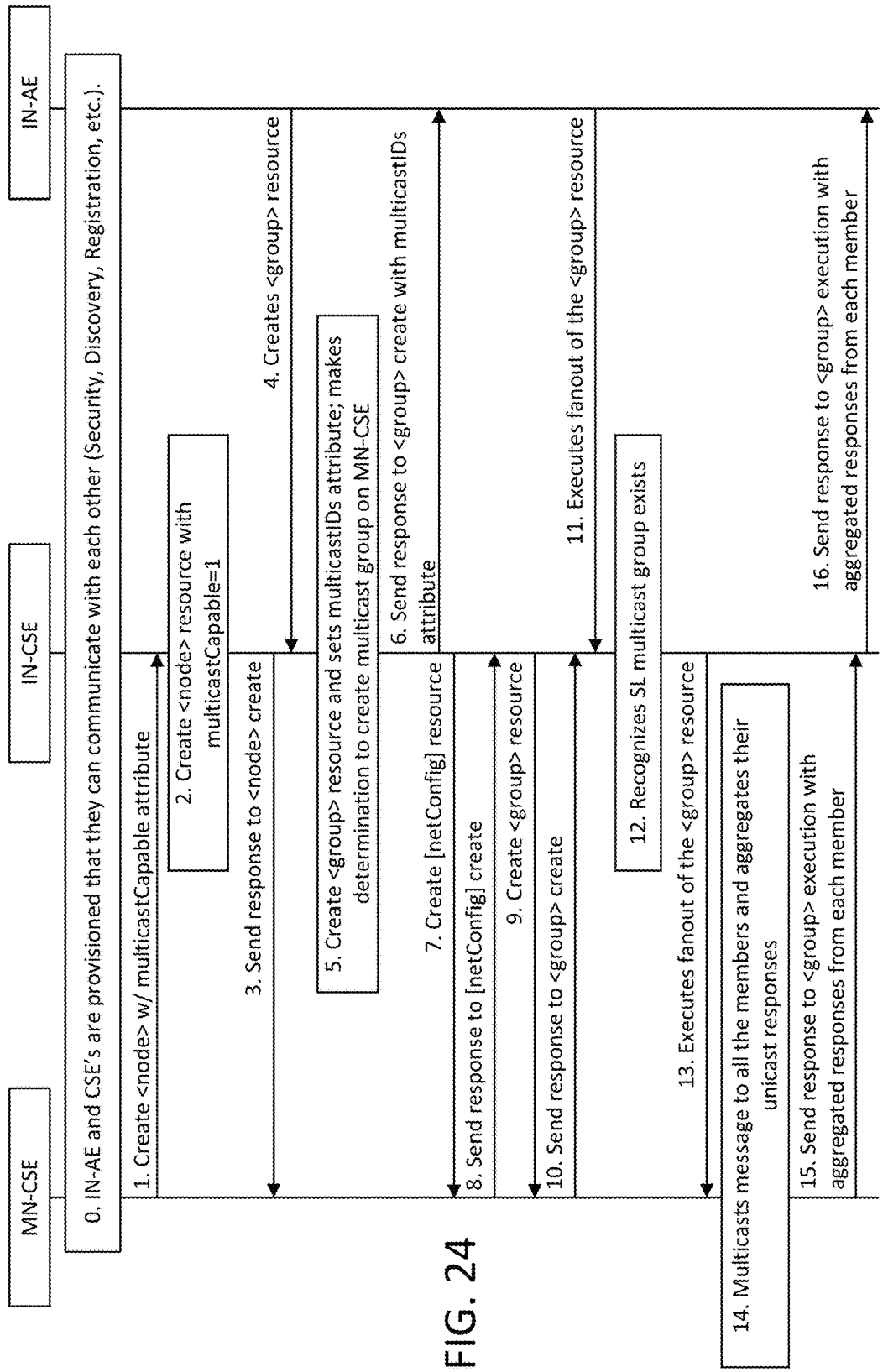
FIG. 24 shows an example call flow in which an MN-CSE informs the IN-CSE that it is multicast capable.

Multicast may also be managed for CSE-to-CSE communications. FIG. 24 shows an example call flow in which an MN-CSE informs the IN-CSE that it is multicast capable by creating a <node> resource on the IN-CSE with the multiCapable attribute. Then an IN-AE creates a <group> resource that includes multiple members managed by the MN-CSE. After responding to the IN-AE of a successful <group> creation, the IN-CSE creates [netConfig] and <group> resources on the MN-CSE to enable multicasting on the MN-CSE.

In step 0, The IN-AE and the CSE's are properly bootstrapped such that they may communicate with each other, which includes among other things security provisioning, service discovery, and registration procedures. In addition, appropriate [areaNwkInfo] and [areaNwkDeviceInfo] resources are created for the MN-CSE. In addition, the IN-AE creates a [netConfig] resource with a multicast address. This [netConfig] resource may be used for configuring multicast addresses to multiple remote CSEs, e.g., for dynamic notification of multicast and SL group creation.

In step 1, the MN-CSE sends a <node> create request with multicastCapable attribute. This informs the IN-CSE that the MN-CSE supports multicast operations to the devices it manages. In step 2, the IN-CSE creates the <node> resource for the MN-CSE and sets the multicastCapable attribute. In step 3, the IN-CSE sends an appropriate response to the <node> create request. In step 4, IN-AE creates a <group> resource with member IDs that include members managed by the MN-CSE. IN-AE also includes a multicastIDs attribute that points to the URI of the [netConfig] resource created in step 0.

In step 5, The IN-CSE creates the <group> resource and sets the multicastIDs provided. In addition, the IN-CSE also recognizes the MN-CSE supports multicast and makes a determination to create an SL multicast group. In step 6, The IN-CSE returns a success response to the IN-AE. Alternatively, the IN-CSE may delay sending this response until it completes steps 7 to 10.

In step 7, the IN-CSE then creates a [netConfig] resource on the MN-CSE with associated network parameters. In step 8, MN-CSE returns an appropriate response to the [netConfig] create, including the URI of the [netConfig] resource. In step 9, IN-CSE also creates a <group> resource on the MN-CSE and sets the multicastIDs attribute with the URI of the local [netConfig] resource on the MN-CSE. The list of memberIDs could be a subset of the <group> resource created on the IN-CSE or it could have the same members.

In step 10, MN-CSE sends an appropriate response of the <group> create to the IN-CSE. In step 11, The IN-AE then executes the fan-out operation for the <group> resource created in step 5. In step 12, the IN-CSE recognizes that an SL multicast group exists via the multicastIDs attribute and re-directs the fan-out operation to the MN-CSE.

In step 13, The IN-CSE sends an execute fan-out request to the MN-CSE targeting the <group> resource on the MN-CSE. Although this procedure currently exists in oneM2M, the context of how it was generated is new. The target URI was switched to that of the <group> resource on the MN-CSE from the original request.

In step 14, The MN-CSE multicast the message to all the members it manages and aggregates their unicast responses. If for some reason certain members do not return a response, the MN-CSE may also unicast the message as an additional attempt to get a response. In step 15, The MN-CSE sends a response with the aggregated results. In the response, it could provide extra information for unsuccessful cases such as multicast or unicast request (or both), time of each attempted request, and the length of time the MN-CSE waits for the response. In step 16, The IN-CSE relays the response provided by the MN-CSE to the IN-AE.

Figure 25:
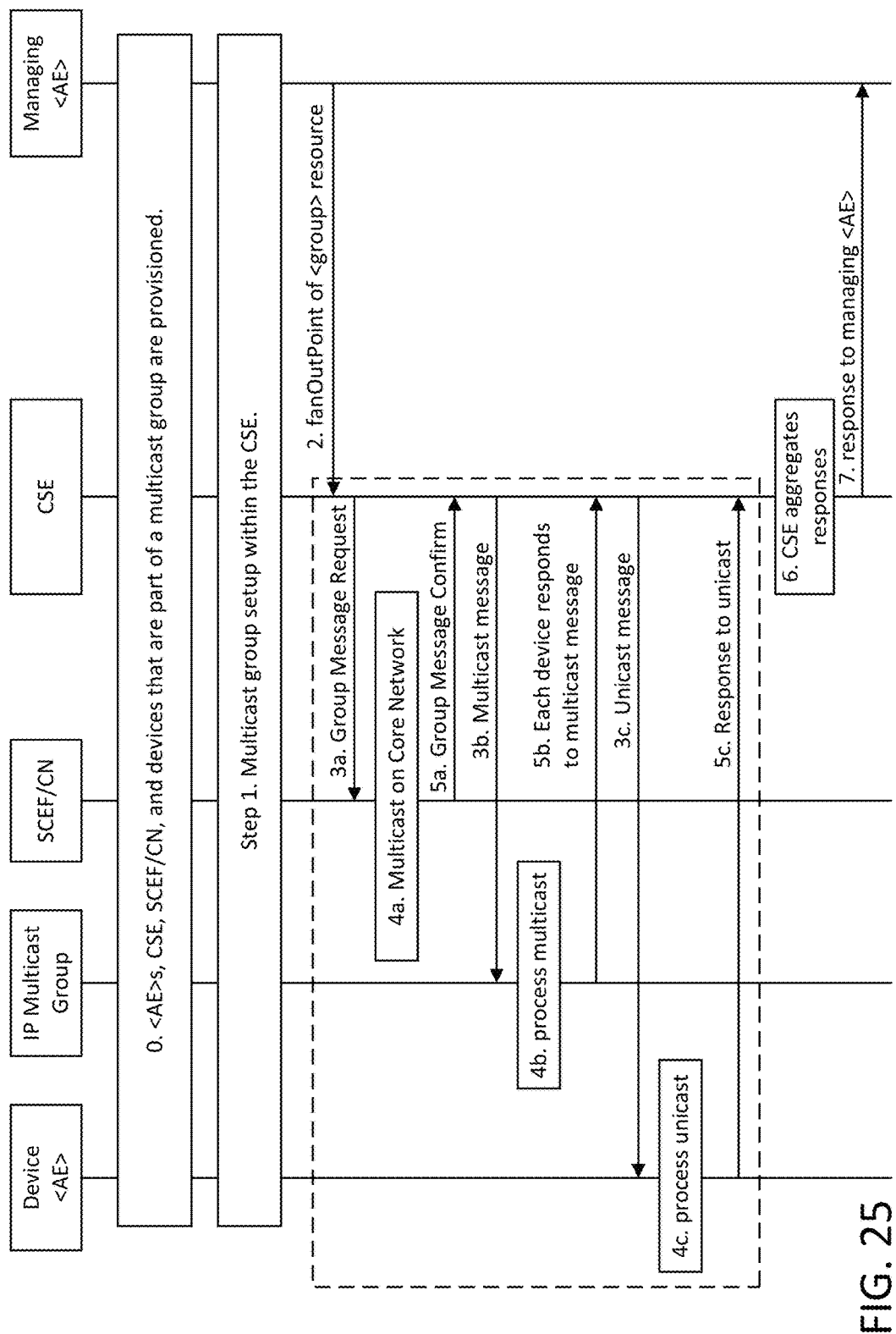
FIG. 25 shows an example call flow in which a oneM2M fan-out operation results in a fan-out to multiple multicast groups and a unicast.

FIG. 25 shows an example call flow in which the oneM2M fan-out operation results in a fan-out to multiple multicast groups as well as a fan-out using a unicast request to a member which does not support multicast capabilities. The <group> resource in this case contains two entries for the multicastIDs and one member of the group does not support multicast. This capability is different from standard IP multicast in that the SL may have a combination of multiple multicast groups as well as unicast members.

In step 0, all the actors are provisioned so they may communicate with each other. In step 1, SL procedures are used to create multicast groups and notify all involved parties. For example, multicast capability indicators may be used in SL registration requests, a service layer multicast configuration resource may be created and maintained, dynamic notifications may be sent regarding multicast and SL group creation, triggers may be established for multicast via service layer fan-out. In the example of FIG. 25, two multicast groups are created: one 3GPP group and a second one for traditional IP multicast group. In addition, there is an <AE> that does not support multicast. Note that more multicast groups are supported, e.g., multiple 3GPP and IP multicast groups specified by one SL <group> resource. In step 2, a managing <AE> executes the fanOutPoint of the <group> resource created in step 1.

Steps 3, 4, and 5 may be carried out in parallel and independently for communications with multiple devices on multiple 3GPP and IP multicast networks. Steps 3, 4, and 5 are performed for each underlying network. In step 3, a multicast or unicast message is sent from the CSE to the respectively parties: SCEF/CN, IP multicast group router or a remote CSE, and the device <AE>. The multicast IP address is obtained from the [netConfig] resource. In step 4, the recipients of the multicast or unicast message process the requests. In step 5, an appropriate response is provided by the recipients back to the CSE. These are unicast messages.

In step 6, The CSE aggregates the responses from step 5. In step 7, The CSE sends an appropriate response to the <AE> of the results of the fan-out operation.

Similar techniques may be applied for functions other than multicast. For example, self-subscription may be used when an ADN node wants to get notification from the CSE to perform some management function requested by a third party application. Another example is the use of self-subscription in access control as described below, and the [netConfig] resource may be used in configuring a CSE's or device's network parameters.

Figure 26:
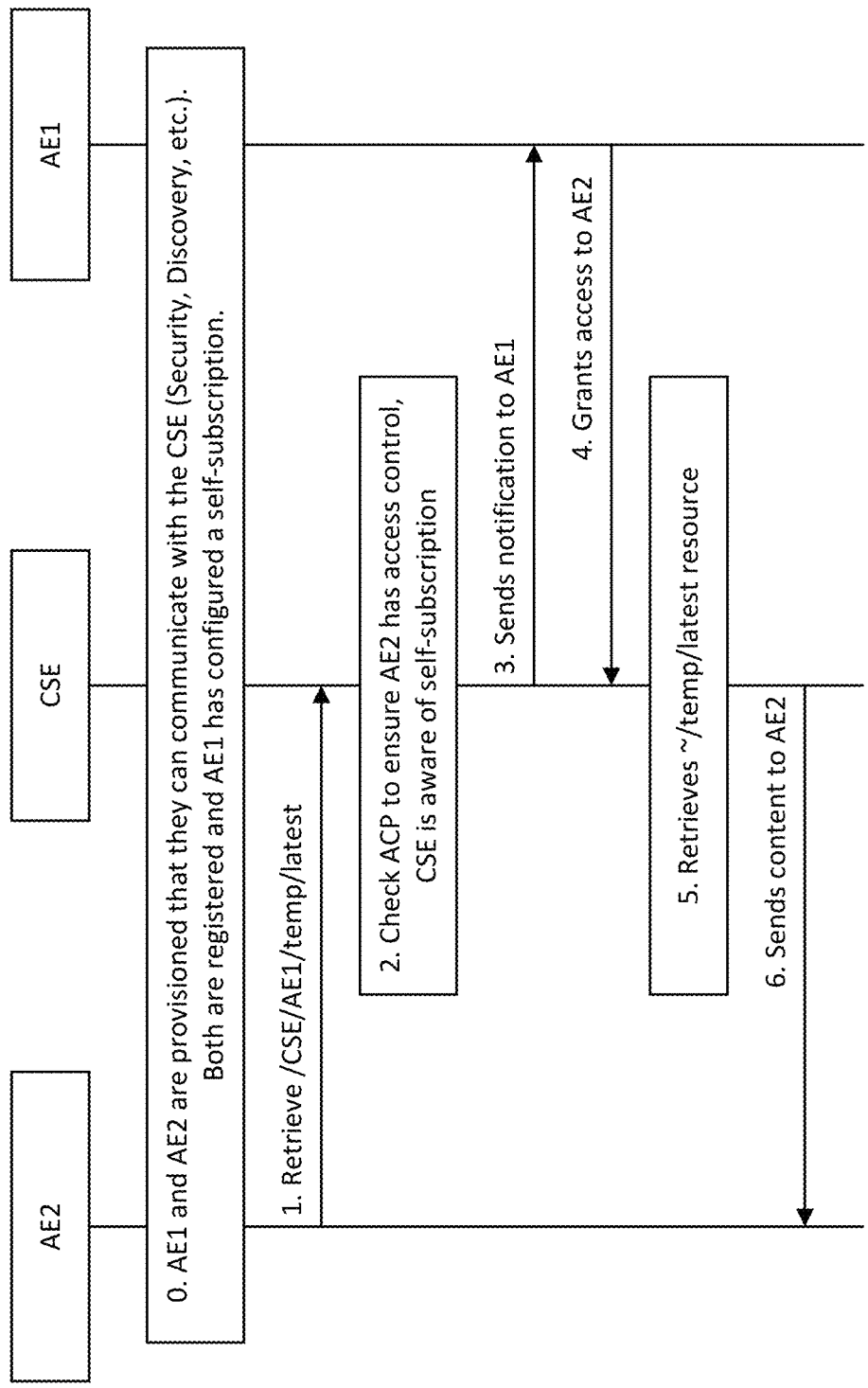
FIG. 26 shows an example call flow in which an AE2 requests a resource from an AE1.

A self-subscription attribute may be used in granting access control to third party applications. Table 12 of the Appendix shows the elements of an example notification message that a CSE sends to a device application to grant access control to the request made by the AEID. FIG. 26 shows an example call flow in which an AE2 is requesting a resource from an AE1 and did not previously have access control for AE1's resource. Since the AE1 had configured a self-subscription, the CSE may send it an unsolicited notification to request the granting of access control to AE2. AE1 responds and allows the CSE to send its resource to AE2.

In step 0 of FIG. 26, AE1 and AE2 are properly bootstrapped such that they may communicate with the CSE, which includes among other things security provisioning and service discovery procedures. Both AE1 and AE2 are registered with the CSE. AE1 also has created a self-subscription with the CSE with eventType=F and eventTypeCategories=2. This configuration informs the CSE to notify AE1 if any third-party AE tries to access AE1's resource without access privileges.

In step 1, AE2 retrieves a resource from AE1. In step 2, CSE checks the access control policy but finds that AE2 does not have access. As part of the access control policy check, the CSE recognizes AE1 has configured a self-subscription to be notified in such case. As a result, the CSE continues to step 3 instead of denying AE2 access.

In step 3, since AE1 has set up a self-subscription, the CSE sends a notification to AE1 requesting that AE2 be granted access. In step 4, AE1 grants access for AE2 and responds to CSE. In step 5, the CSE retrieves the resource. In step 6, the CSE sends the contents of the resource to AE2.

Figure 27:
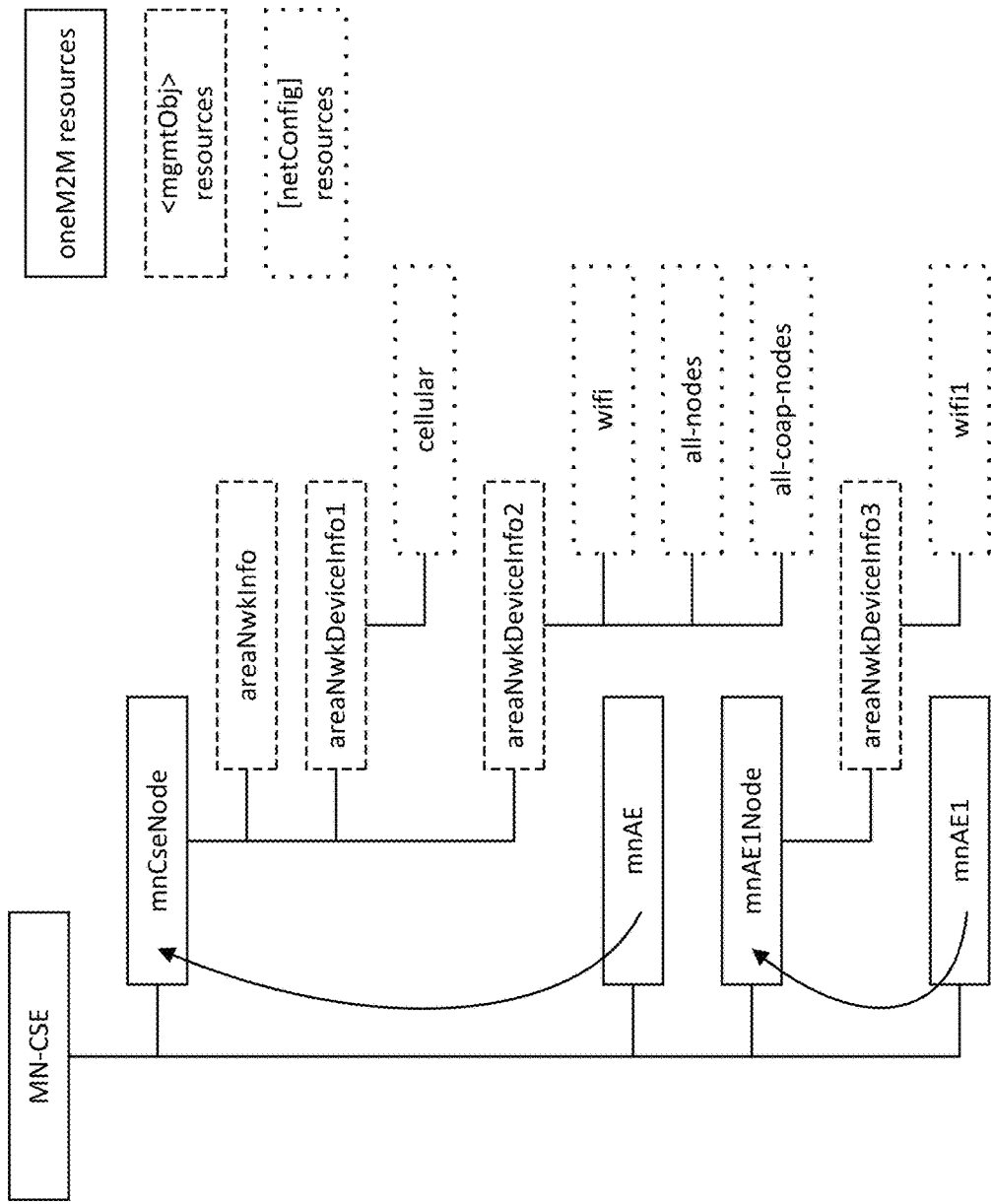
FIG. 27 shows an example oneM2M resource tree for an MN-CSE with resources for each of a number of interfaces.

A oneM2M MN-CSE that is hosted in the field may have numerous network interfaces with which it communicates. There may be a cellular interface for communicating to an IN-CSE residing in the internet, a Wifi interface for communicating to the field nodes it manages, and multiple interfaces for multicast operations. FIG. 27 shows an example oneM2M resource tree for an MN-CSE with the [netConfig] <mgmtObj> resources for each of the interfaces. The mnAE manages the MN-CSE and has its nodeLink attribute pointed to the mnCseNode resource, where all the network resources for the MN-CSE reside. There are two [areaNwkDeviceInfo] resources to account for different sleep states of the corresponding interfaces. For the cellular interface, the sleep state is from 7 am to 7 pm Monday to Friday. The sleep state for the other three interfaces are always on, with no sleep state enabled.

Resources for one of the devices the MN-CSE manages are also shown. The resource mnAE1 also has a node resource mnAE1Node and a child [netConfig] resource—an example oneM2M embodiment is shown in Table 13 of the Appendix. The [netConfig] resource would be created by the MN-AE based on the network configuration it gathered, either through DHCP, user configuration, or some other method. Then if network parameters changed, such as a new IP address from DHCP, the MN-AE may update the [netConfig] resource accordingly. As the [netConfig] resource of mnAE1 could provide the MN-CSE information on how to communicate to it, e.g., to support a service layer configuration resource. Specifically, the combination of protocolsSupported (CoAP) and mtu (maximum transmission unit/message size) attributes could be used to properly configure CoAP messages using the appropriate block sizes that are sent to the device. This is in addition to the information the MN-CSE may use to infer that mnAE1 supports multicast.

Figure 28:
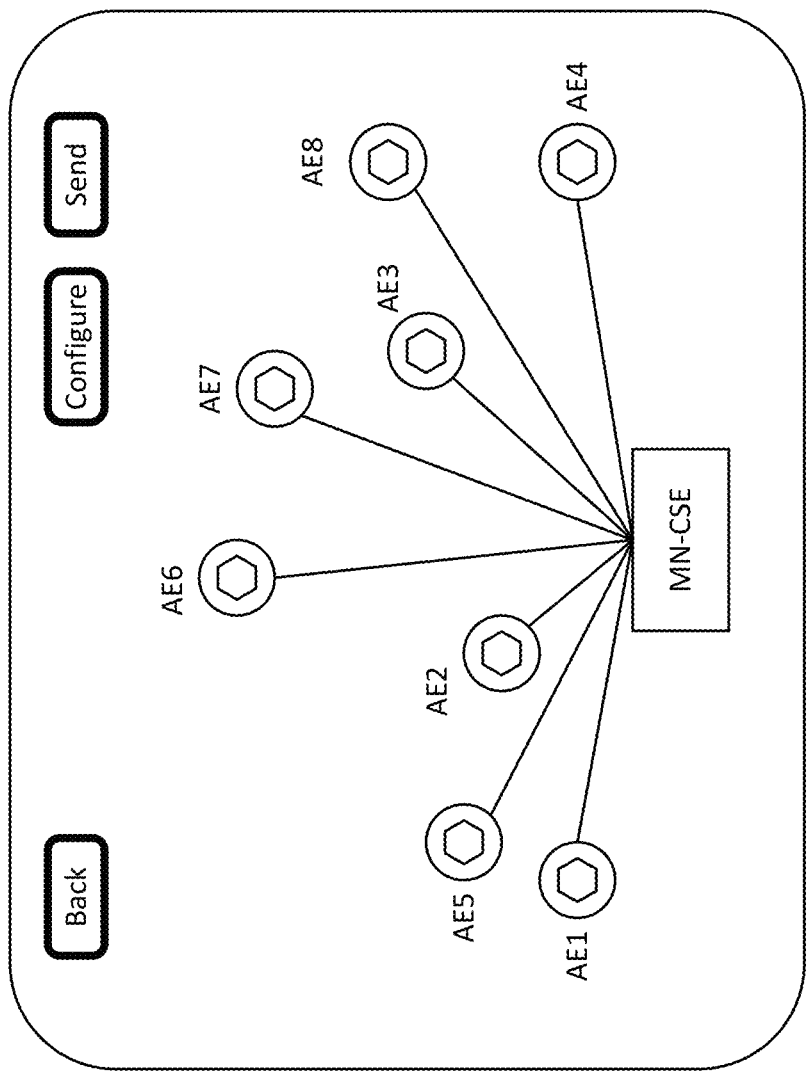
FIG. 28 shows an example screen of a user interface for an application realizing multicast functionality.

FIG. 28 shows an example screen of a user interface for an application for realizing multicast functionality. The use case is a field deployment of environmental sensors AE1 to AE8 in a remote area, e.g., along a mountain. A gateway device hosts an MN-CSE that multicasts messages to the sensors. The user application shows the proximity of the sensors to the MN-CSE and uses a touch interface to select the sensors for grouping into a multicast group. When selected, a circle is placed over the sensor and a line connects it to the MN-CSE. At the top are the navigate and action buttons for the user to use. The Back button navigates the application back to the home screen. The Configure button allows the user to adjust the network parameters and the contents to include in the multicast message. When the Configure button is pressed, another screen (not shown) appears to allow the user to configure the multicast address and the contents of the multicast message. The Send button activates the sending of a multicast message in accordance with information the user provided in the screen associated with the Configure button.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 29:
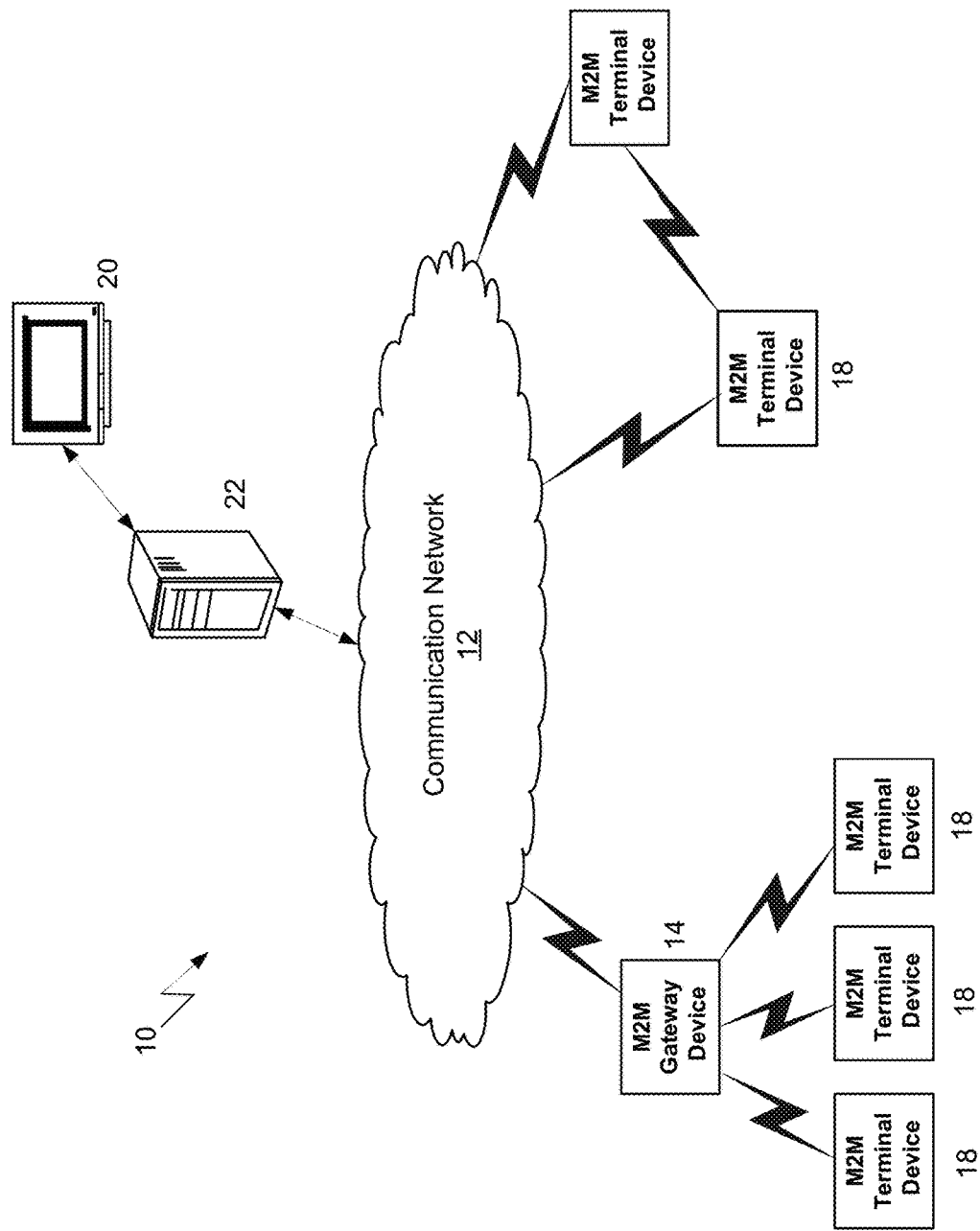
FIG. 29 is a system diagram of an example machine-to-machine (M2M), Internet of Things (IoT), or Web of Things (WoT) communication system in which one or more disclosed embodiments may be implemented.

FIG. 29 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the client, proxy, or server devices illustrated in any of FIGS. 3-9, 11-13, 15, 16, 18, 19 and 21-28 may comprise a node of a communication system such as the ones illustrated in FIGS. 2, 4, and 14.

As shown in FIG. 29, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 30:
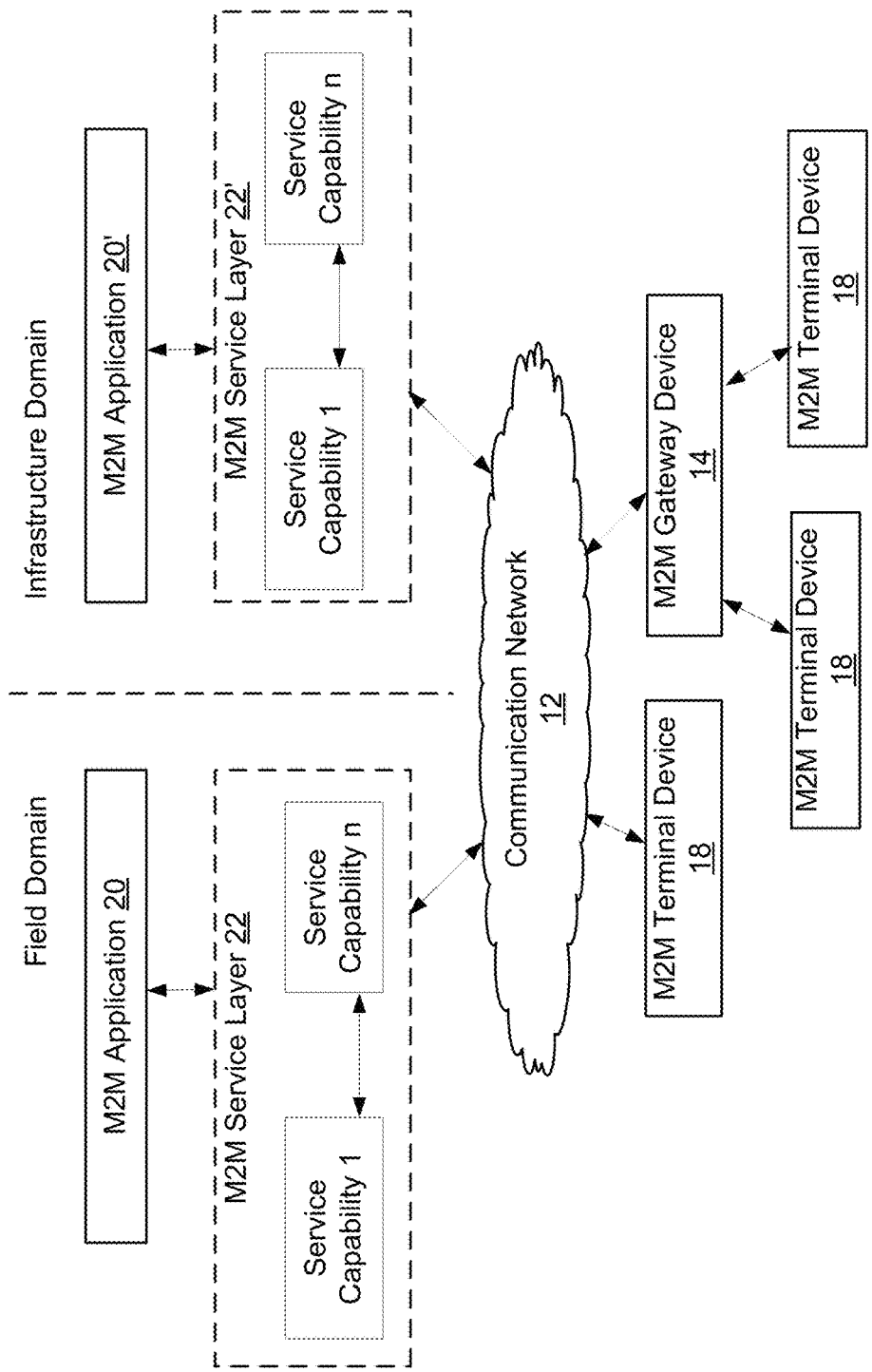
FIG. 30 is a system diagram of an example architecture that may be used within the M2M/IoT/WoT communications system illustrated in FIG. 29.

Referring to FIG. 30, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise server, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 30, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 29 and 30, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g., infrastructure node, middle node, application-specific node). The Third Generation Partnership Project (3GPP) has also defined an architecture for machine-type communications (MTC). In that architecture the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 31 or FIG. 32 described below.

Further, the methods and functionalities described herein may be implemented as part of an M2M network that uses a Service Oriented Architecture (SOA) and/or a Resource-Oriented Architecture (ROA) to access services.

Figure 31:
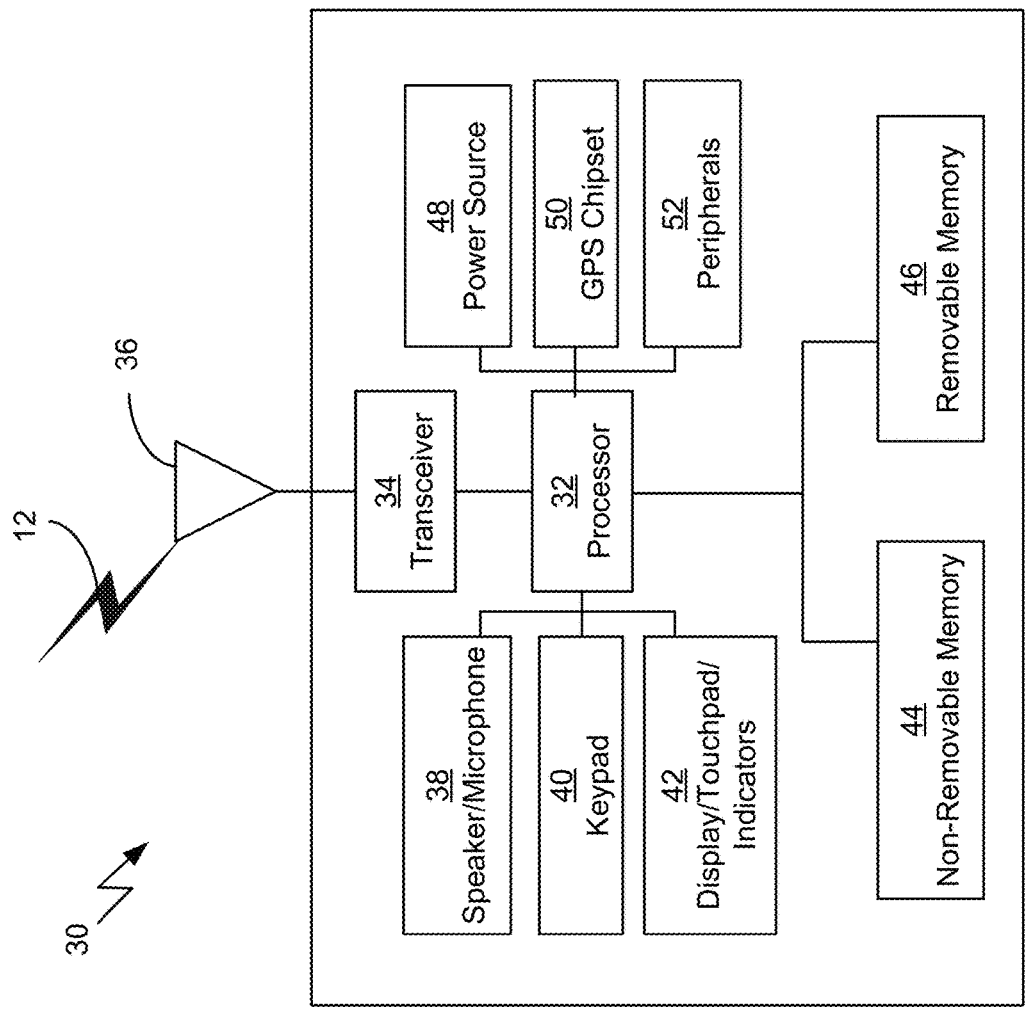
FIG. 31 is a system diagram of an example communication network node, such as an M2M/IoT/WoT device, gateway, or server that may be used within the communications system illustrated in FIGS. 29 and 30.

FIG. 31 is a block diagram of an example hardware/software architecture of a node of a network, such as one of the clients, servers, or proxies illustrated in FIGS. 3-9, 11-13, 15, 16, 18, 19 and 21-28 which may operate as an M2M server, gateway, device, or other node in an M2M network such as that illustrated in FIGS. 29 and 30. As shown in FIG. 31, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements aspects of the end-to end authentication functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 31, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 3-9, 11-13, 15, 16, 18, 19 and 21-28) and in the claims. While FIG. 31 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 31 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 32:
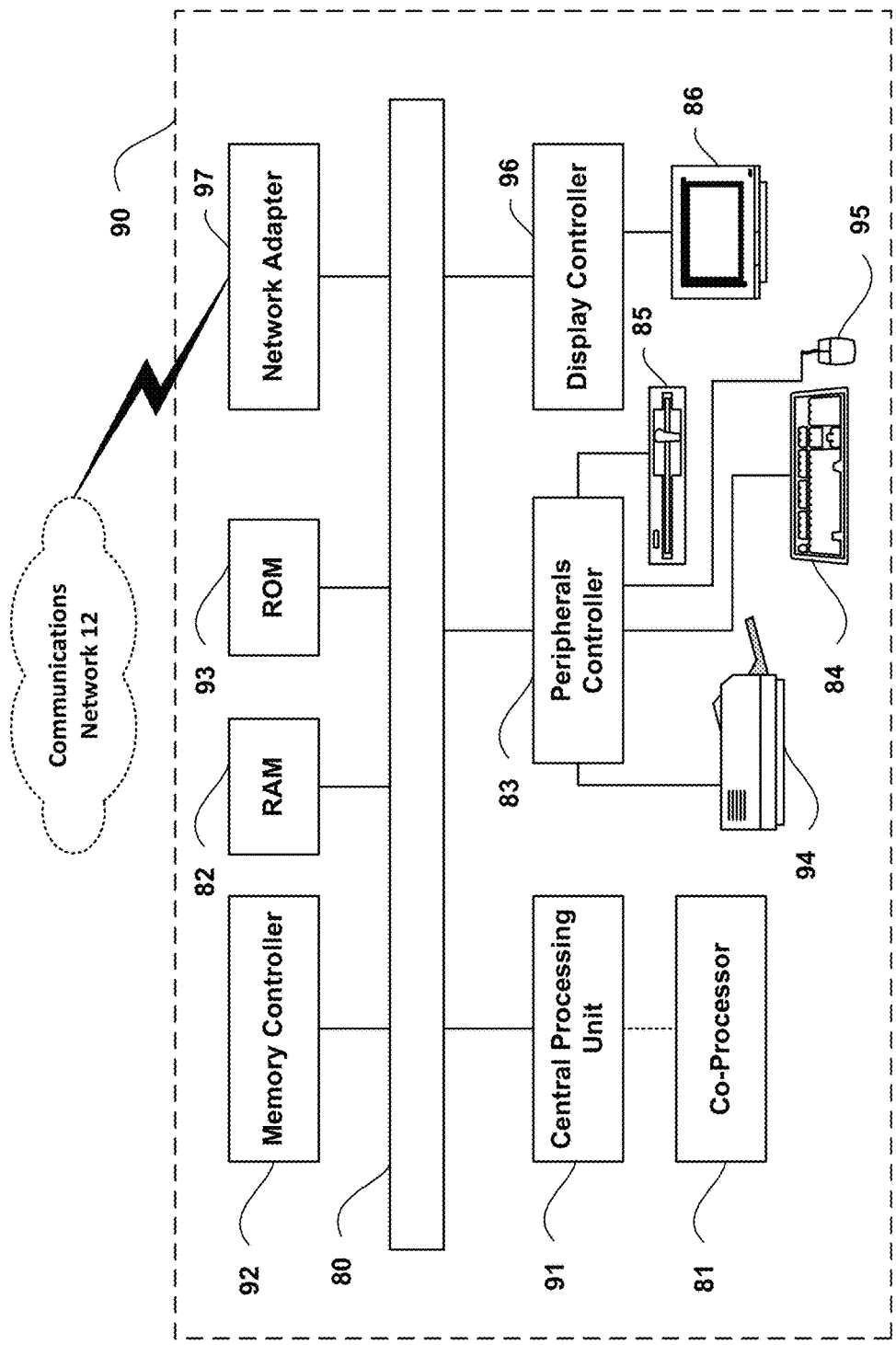
FIG. 32 is a block diagram of an example computing system in which a node of the communication system of FIGS. 29 and 30 may be embodied.

FIG. 32 is a block diagram of an exemplary computing system 90 which may also be used to implement one or more nodes of a network, such as the clients, servers, or proxies illustrated in FIGS. 3-9, 11-13, 15, 16, 18, 19 and 21-28, which may operate as an M2M server, gateway, device, or other node in an M2M network such as that illustrated in FIGS. 29 and 30. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 29 and FIG. 30, to enable the computing system 90 to communicate with other nodes of the network. The communication circuitry, alone or in combination with the CPU 91, may be used to perform the transmitting and receiving steps described herein, e.g., in FIGS. 3-9, 11-13, 15, 16, 18, 19 and 21-28, and in the claims.

FIGS. 3-9, 11-13, 15, 16, 18, 19 and 21-28, the descriptions thereof, and the claims herein illustrate various embodiments of methods and apparatus for enabling end-to-end authentication functionality. In these figures, various steps or operations are shown being performed by one or more clients, servers, and/or proxies. It is understood that the clients, servers, and proxies illustrated in these figures may represent logical entities in a communication network and may be implemented in the form of software, i.e., computer-executable instructions, stored in a memory of, and executing on a processor of, a node of such network, which may comprise one of the general architectures illustrated in FIG. 29 or 30 as described herein. That is, the methods illustrated in FIGS. 3-9, 11-13, 15, 16, 18, 19 and 21-28 and the claims may be implemented in the form of software, i.e., computer-executable instructions stored in a memory of a network node, such as for example the node or computer system illustrated in FIG. 31 or 32, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 31 and 32 respectively) of the node under control of the processor of the node and the computer-executable instructions (e.g., software) that it executes.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile media, and removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

APPENDIX

TABLE 1

| | Abbreviations |
|---|---|
| 3GPP | $3^{rd}$ Generation Partnership Project |
| ADN | Application Dedicated Node |
| AE | Application Entity |
| API | Application Programming Interface |
| BM-SC | Broadcast Multicast Service Center |
| CN | Core Network |
| CoAP | Constrained Application Protocol |
| CPU | Central Processing Unit |
| CSE | Common Services Entity |
| CSF | Common Services Function |
| DM | Device Management |
| FQDN | Fully Qualified Domain Name |
| GPIO | General Purpose Input/Output |
| GW | Gateway |
| HSS | Home Subscriber Server |
| HTTP | HyperText Transfer Protocol |
| IGMP | Internet Group Management Protocol |
| IMEI | International Mobile Station Equipment Identity |
| IN | Infrastructure Node |
| IP | Internet Protocol |
| IoT | Internet of Things |
| M2M | Machine-to-Machine |
| M.A.S. | Multicast Address Specify |
| MBMS | Multimedia Broadcast Multicast Service |
| MLD | Multicast Listener Discovery |
| MLI | Multi Listener Interval |
| MN | Middle Node |
| MTU | Maximum Transmission Unit |
| ND | Neighbor Discovery |
| NSE | Network Services Entity |
| OS | Operating System |
| RAM | Random Access Memory |
| RPL | Routing Protocol for Low Power and Lossy Networks |
| ROM | Read Only Memory |
| SCEF | Service Capability Exposure Function |
| SCS/AS | Service Capability Server/Application Server |
| SL | Service Layer |
| TMGI | Temporary Mobile Group Identify |
| UDP | User Datagram Protocol |
| UE | User Equipment |
| UN | Underlying Networks |
| URI | Uniform Resource Identifier |

TABLE 2

Terms and Definitions

| Term | Definition |
| --- | --- |
| Device Application | An SL application that represents some functionality provided by a device or entity. Typically, the devices is being managed by a managing application. The device application offers the same functionality as the device itself, and herein may be referred to interchangeably. |
| Fan-out Operation | A process in which an SL generates requests to members of a group resource when a group operation is triggered using, e.g., a fanOutPoint resource. |
| Group Messaging | This term is applied to group communications in 3GPP architecture via the SCEF, e.g., in which messages about the management of groups are exchanged. |
| Group Operation | An operation which involves communicating to members of a group The operation could include any RESTful CRUD operation on the setting and configuration of a group resource. This term could be applied to SL or 3GPP architectures. |
| Managing Application | An SL application that has access privilege to manage device applications and perform resource manipulation on the device application's behalf. |
| Mca | oneM2M reference point for SL communications between an AE and a CSE |
| Mcc | oneM2M reference point for SL communications between two CSEs |
| Mcc' | oneM2M reference point for SL communications between two IN-CSEs that reside in different oneM2M service provider domains |
| Mcn | oneM2M reference point for SL communications between a CSE and an NSE in underlying networks |
| Multicast | Herein, the term "multicast" does not necessarily mean IP Multicast. but rather refers to any procedure where a single message is transmitted to multiple recipients. |
| Multicast Capability | A capability within a device or entity that allows for receiving multicast messages. The device application is aware of this capability through the availability of network API on the protocol stack. |
| Multicast Group | A term used for cases in which individual group members may exchange information through the use of multicast, whether it is IP-based multicast, 3GPP-based multicast, or some other multicast mechanism. Generally, there will be one request made to all the members of the multicast group. |
| SCS/AS | This is the 3GPP term used for a server, such as a service layer server. |
| Self-subscription | An SL subscription resource created by SL applications to allow SLs to send unsolicited notifications to the application based on actions within the SL that require the application's attention, e.g., the SL informing the application of its inclusion in a multicast group. The application is making a subscription to itself. |
| SL Multicast Group | This term refers to a virtual group created by the SL based on information provided by the netConfig and group resources. The SL notifies members of the group of their membership and provides them with the multicast address and other network parameters. This term may be used to refer to the SL procedure that is executed to create a "multicast group." "Multicast group" is the more general term. |

TABLE 3 areaNwkInfo <mgmtObj> Resource Specific Attributes

| Attributes of [areaNwkInfo] | Multiplicity | RW/ RO/ WO | Description |
| --- | --- | --- | --- |
| mgmtDefinition | 1 | WO | See clause 9.6.15. Has fixed value "areaNwkInfo" to indicate the resource is for area network information. |
| objectIDs | 0 . . . 1 (L) | RW | See clause 9.6.15. |
| objectPaths | 0 . . . 1 (L) | RW | See clause 9.6.15. |
| description | 0 . . . 1 | RW | See clause 9.6.15. |
| areaNwkType | 1 | RW | The areaNwkType is an implementation-chosen string that indicates the type of M2M Area Network. This attribute is a specialization of [objectAttribute] attribute. |
| listOfDevices | 1 | RW | Indicates the list of devices in the M2M Area Network. The attribute contains references to [areaNwkDeviceInfo] resource. From listOfDevices, |

TABLE 3-continued areaNwkInfo <mgmtObj> Resource Specific Attributes

| Attributes of [areaNwkInfo] | Multiplicity | RW/ RO/ WO | Description |
| --- | --- | --- | --- |
| | | | the topology of the area network may be discovered and retrieved. This attribute is a specialization of [objectAttribute] attribute. |

TABLE 4 areaNwkDeviceInfo <mgmtObj> Resource Specific Attributes

| Attributes of [areaNwkDeviceInfo] | Multiplicity | RW/ RO/ WO | Description |
| --- | --- | --- | --- |
| mgmtDefinition | 1 | WO | See clause 9.6.15. Has fixed value "areaNwkDeviceInfo" to indicate the resource is for area network device information. |
| objectIDs | 0 ... 1 (L) | RW | See clause 9.6.15. |
| objectPaths | 0 ... 1 (L) | RW | See clause 9.6.15. |
| description | 0 ... 1 | RW | See clause 9.6.15. |
| devId | 1 | RW | Indicates the ID of the device. It could be the ID of the hardware or nodeId. This attribute is a specialization of [objectAttribute] attribute. |
| devType | 1 | RW | Indicates the type of the device. The attribute also indicates the functions or services that are provided by the device. Examples include temperature sensor, actuator, Zigbee coordinator or Zigbee router. This attribute is a specialization of [objectAttribute] attribute. |
| areaNwkId | 1 | RW | The reference to an areaNwkInfo resource which this device associates with. This attribute is a specialization of [objectAttribute attribute. |
| sleepInterval | 0 ... 1 | RW | The interval between two sleeps. This attribute is a specialization of [objectAttribute] attribute. |
| sleepDuration | 0 ... 1 | RW | The time duration of each sleep. This attribute is a specialization of [objectAttribute] attribute. |
| status | 0 ... 1 | RW | The status of the device, e.g., sleeping or awake. |
| listOfNeighbors | 1 | RW | Indicates the neighbour devices of the same area network. When modified, the connection relationship of the devices shall be modified accordingly. This attribute is a specialization of [objectAttribute] attribute. |

TABLE 5

Examples of Proposed netConfig Resource Parameters

| netConfig parameters | Description |
| --- | --- |
| Network Type | The type of network this netConfig resource applies to. Examples are IP, 3GPP, Zigbee, 6LoWPAN, etc. |
| Wakeup Schedule | Specifies a time at which the device should wakeup and listens for messages and can be used in support of receiving multicast messages; this enables the calling of the listening APIs of Examples 1 and 2 |
| IP netConfig | netConfig resource for IP networks |
| Hostname | The hostname of the machine where the device application resides. |
| Domain Name | The domain of the machine where the device application resides. |
| IP Address | This parameter may be a list of IP addresses where the device application may be reached. They may be global, link-local, multicast, virtual, etc. |
| Subnet Mask | The mask for the subnetwork. |
| Default Gateway | The default gateway of the machine that identifies the entity which manages the device. For example, the entity may be another SL, a multicast router, or some other network device |

TABLE 5-continued

Examples of Proposed netConfig Resource Parameters

| netConfig parameters | Description |
| --- | --- |
| Protocols Supported | A list of protocols supported by the device; examples include HTTP, CoAP, TLS, DTLS, MLD, RPL, ND, etc. The SL may use this information to determine which protocols to use for exchanging messages with the device. |
| MTU | The maximum message size sent or received by the device. |
| Source Specific Address | The IP address or addresses of the source node that transmits the multicast address. This parameter could be used with MLD messages. |
| 3GPP netConfig | netConfig resource for 3GPP networks |
| APN | The Access Point Name corresponding to a PDN connection that may be used to send messages to the device. |
| External Identifier | The 3GPP External Network Identifier |
| Internal Identifier | The 3GPP Internal Network Identifier (e.g., IMSI) |
| External Group ID | The 3GPP External Group ID corresponding to a 3GPP Internal Group ID that is provisioned in the device's subscription information, Mobility Management Context and/or SCEF. |
| Internal Group ID | The 3GPP Internal Group ID that is provisioned in the device's subscription information, Mobility Management Context, and/or SCEF. |
| IMEI | The IMEI number of the UE device. |
| Phone Number | The phone number of the UE device. |
| Network Type | Type of cellular network: 2G, 3G, HSPA, LTE, etc. |
| TMGI | The MBMS broadcast identifier that the devices listens to. |
| MBMS Bearer ID | The MBMS Bearer ID that is associated with the TMGI or group and may be used for the MBMS service |
| EPS Bearer ID | The EPS/MBMS Bearer ID that is associated with the APN and may be used for sending messages to the device |
| BT Config | netConfig resource for BlueTooth network |
| Name | The name of the Bluetooth device. |
| Baudrate | The transfer rate of the Bluetooth communication. |
| Pairing Code | The Bluetooth code used to pair devices together. |

TABLE 6

New oneM2M multicastCapable Attribute of <AE> Resource

| Attributes of <AE> | Multiplicty | RW/ RO/ WO | Description | <AEAnnc> Attributes |
| --- | --- | --- | --- | --- |
| pointOfAccess | 0 . . . 1 (L) | RW | The list of addresses for communicating with the registered Application Entity over Mca reference point via the transport services provided by Underlying Network (e.g., IP address, FQDN, URI). This attribute shall be accessible only by the AE and the Hosting CSE. If this information is not provided and the <pollingChannel> resource does exist, the AE should use <pollingChannel> resource. Then the Hosting CSE may forward a request to the AE without using the PoA. | OA |
| multicastCapable | 0 . . . 1 | RW | Indicates the node the AE resides on supports receiving multicast messages. Values are TRUE or FALSE. | NA |
| requestReachability | 1 | RW | If the AE that created this <AE> resource may receive a request, this attribute is set to "TRUE" otherwise "FALSE" | OA |
| nodeLink | 0 . . . 1 | RW | The resourceID of a <node> resource that stores the node specific information where this AE resides. | OA |

TABLE 7

New oneM2M multicastCapable Attribute for <node> Resource

| Attributes of <node> | Multiplicity | RW/RO/WO | Description | <nodeAnnc> attributes |
|---|---|---|---|---|
| ... | | | | |
| nodeID | 1 | RW | The M2M-Node-ID of the node which is represented by this <node> resource. | MA |
| multicastCapable | 0 ... 1 | RW | Indicates the node the AE resides on supports receiving multicast messages | NA |
| hostedCSELink | 0 ... 1 | RW | The resource ID of a resource where all of the following applies: The resource is a <CSEBase> resource or a <remoteCSE> resource. The resource is hosted on the same CSE as the present <node> resource. The resource represents the CSE which resides on the specific node that is represented by the current <node> resource. | OA |
| mgmtClientAddress | 0 ... 1 | RW | Represents the physical address of management client of the node which is represented by this <node> resource. This attribute is absent if management server is able to acquire the physical address of the management client. | OA |

TABLE 8

New <subscription> eventTypeCategories Attribute

| Attributes of <subscription> | Multiplicity | RW/RO/WO | Description | <AEAnnc> Attributes |
|---|---|---|---|---|
| eventTypeCategories | 0 ... 1 (L) | RW | For self-subscription eventType, these are the categories the requestor would like to get notifications for:<br>1 = one of requestor's resource is part of multicast group configuration<br>2 = CSE needs to contact requestor to grant access for request made by a 3rd party application to a resource the requestor owns.<br>3 = a third party AE would like to perform some management function on the node associated with the AE who has specified the self-subscription. | NA |

TABLE 9 oneM2M Ssubscription eventType for the eventNotificationCriteria attribute

| Condition tag | Multiplicity | Matching condition |
|---|---|---|
| eventType | 0 ... n | The type of event. Possible event type values are:<br>A. Update to attributes of the subscribed-to resource<br>B. Deletion of the subscribed-to resource<br>C. Creation of a direct child of the subscribed-to resource<br>D. Deletion of a direct child of the subscribed-to resource<br>E. An attempt to retrieve a <contentInstance> direct-child-resource of a subscribed-to <container> resource is performed while this <contentInstance> child resource is an obsolete resource or the reference |

TABLE 9-continued oneM2M Ssubscription eventType for the eventNotificationCriteria attribute

| Condition tag | Multiplicity | Matching condition |
|---|---|---|
| | | used for retrieving this resource is not assigned. This retrieval is performed by a RETRIEVE request targeting the subscribed-to resource with the Result Content parameter set to either "child-resources" or "attributes + child-resources"<br>F. Self-subscription: This event type applies to notifications that are generated when the CSE needs to send an unsolicited request to the subscriber based on the eventTypeCategories.<br>The other conditions in eventNotificationCriteria conditions apply to the selected eventType. For example, if eventType is "Creation of a direct child of the subscribed-to resource" then other eventNotificationCriteria conditions is applied to the direct child resources of the subscribed-to resource. If this condition is not specified, the default value is "Update to attributes of the subscribed-to resource". The notion of "obsolete resource" is defined in clause 9.6.1.3.2 (Common attributes). |

TABLE 10 oneM2M group multicastIDs attribute

| Attributes of <group> | Multiplicity | RW/ RO/ WO | Description | <groupAnnc> Attributes |
|---|---|---|---|---|
| ... [others not listed] | | | | |
| multicastIDs | 0 ... 1 (L) | RW | Contains the URI(s) of [netConfig] resources in which this group resource is associated with. This attribute specifies what network parameters to use when multicasting | NA |
| memberIDs | 1 (L) | RW | List of member resource IDs referred to in the remaining of the present document as memberID. Each ID (memberID) should refer to a member resource or a (sub-) <group> resource of the <group>. | OA |
| groupName | 0 ... 1 | RW | Human readable name of the <group>. | OA |

TABLE 11

Elements of CSE Notification Message of Group Membership

| Element Path | Element Data Type | Multiplicity | Note |
|---|---|---|---|
| mulitcastAddress | xs:string | 1 | The multicast address the device should monitor for messages from the CSE. |
| multicastTargetURI | xs:anyURI | 1 | This is the target URI that is included in the multicast message. |
| resourceURI | xs:anyURI | 1 | Specifies a URI of the resource on the device the request is for. |
| scheduledTime | xs:string | 0 ... 1 | If multicast is scheduled, the time the devices should be on to receive the multicast message |
| External or Internal Group ID | xs:string | 0 ... 1 | 3GPP identifiers the SCEF uses to creak multicast groups within the Core Network. |
| TMGI | xs:string | 0 ... 1 | |
| APN | xs:string | 0 ... 1 | |
| EBI | xs:string | 0 ... 1 | |
| messagePayload | xs:string | 0 ... 1 | The payload if the request is either CREATE or UPDATE. |

TABLE 12

Elements of CSE Notification Message for Access Control

| Element Path | Element Data Type | Multiplicity | Note |
|---|---|---|---|
| AEID | xs:string | 1 | The AE ID of the requestor trying to access the resource. |
| resourceID | xs:string | 1 | The ID of the resource the requestor is trying to access. |
| Operation | xs:string | 1 | The CRUD operation of the request. |
| reqPayload | xs:string | 0 . . . 1 | The payload if the request is either CREATE or UPDATE. |

TABLE 13

Example of Proposed [netConfig] oneM2M Resource Attributes

| Attributes of [netConfig] | Multiplicity | RW/ RO/ WO | Description | <AEAnnc> Attributes |
|---|---|---|---|---|
| mgmtDefinition | 1 | WO | See clause 9.6.15. Has fixed value "netConfig" to indicate the resource is for area network information. | OA |
| objectIDs | 0 . . . 1 (L) | RW | See clause 9.6.15 of oneM2M TS-0001 oneM2M Functional Architecture, V-2.6.0 | OA |
| objectPaths | 0 . . . 1 (L) | RW | See clause 9.6.15 of oneM2M TS-0001 oneM2M Functional Architecture, V-2.6.0 | OA |
| description | 0 . . . 1 | RW | See clause 9.6.15 of oneM2M TS-0001 oneM2M Functional Architecture, V-2.6.0 | OA |
| networkType | 0 . . . 1 | RW | This attribute provides the network type associated with this [netConfig] resource. | NA |
| scheduledWakeUp | 0 . . . 1 | RW | This attribute provides a time for a device to wake up from sleeping in support of receiving multicast messages | NA |
| hostname | 0 . . . 1 | RW | The hostname of the node that could be used to generate a FQDN | NA |
| domainName | 0 . . . 1 | RW | The IP domain where the node resides and may be used to generate a FQDN | NA |
| ipAddress | 0 . . . 1 | RW | A numerical IP address and port number that a node may be reach in an IP network | NA |
| subnetMask | 0 . . . 1 | RW | A mask used for the sub network the node resides in | NA |
| defaultGateway | 0 . . . 1 | RW | The IP address of the gateway that manages the node | NA |
| protocolsSupported | 0 . . . 1 (L) | RW | A list of protocols the node supports in order of preferences. The list is constructed in reverse order of the IP stack beginning with the Application Layer protocols down to the PHY Layer protocols. Alternatively, this attribute could be divided into a complex type where each layer is represented as a sub type. The CSE may infer the capabilities of the node through this attribute. | OA |
| mtu | 0 . . . 1 | RW | The Maximum Transmission Unit the node may process - this represents the maximum message size the node and send/receive. | OA |
| sourceSpecificAddress | 0 . . . 1 (L) | RW | A list of IP addresses that transmits the multicast message and may be used as part of MLD reports | NA |

We claim:

1. An apparatus comprising a processor, a memory, and communication circuitry, the apparatus being connected to a communications network via the communication circuitry, the apparatus further comprising computer-executable instructions stored in the memory of the apparatus which, when executed by the processor of the apparatus, cause the apparatus to:

provide a service layer entity;

receive, from multiple entities, indications of underlying multicast capabilities comprising, for each of the multiple entities, an indication of a type of multicast supported by the entity for an underlying network;

maintain one or more service layer resources for a multicast configuration;

receive a request from the first entity to create a service layer group;

create the service layer group by selecting members among the multiple entities, wherein the selection is based at least in part on the indications of multicast capabilities;

receive, from a second entity, a first fanout operation request, the first fanout operation request pertaining to the service layer group;

send requests to members of the service layer group using one or more of the underlying multicast capabilities;

aggregate responses to the requests received from one or more members of the service layer group;

send, based on a timer, an aggregated response to the second entity;

determine a first subgroup comprising one or more members of the service layer group that did not send back responses after the timer expires; and send, in accordance with the first fanout operation request, a unicast to each member of the first subgroup.

2. The apparatus of claim 1, wherein:

the indications of multicast capabilities comprise indications of IP multicast capability or 3GPP multicast capability; and the computer-executable instructions further cause the apparatus to store the indications of IP multicast capability or 3GPP multicast capability in the one or more service layer resources for a multicast configuration.

3. The apparatus of claim 2, wherein the computer-executable instructions further cause the apparatus to include two or more multicast groups within the service layer group, where the multicast groups separately comprise either:

a set of members residing on a common underlying network; or a set of members using a common multicast technology, where the common multicast technology is IP multicast or 3GPP multicast.

4. The apparatus of claim 2, wherein:

the computer-executable instructions further cause the apparatus to maintain one or more of the service layer resources for the multicast configuration based on resources providing area network information or area network device information; and wherein the one or more of the service layer resources for the multicast configuration based on resources providing area network information or area network device information comprise indications of IP multicast capability or 3GPP multicast capability.

5. The apparatus of claim 1, wherein the computer-executable instructions further cause the apparatus to include a first entity in the service layer group based upon a request by the first entity to join the service layer group.

6. The apparatus of claim 1, wherein the computer-executable instructions further cause the apparatus to include a first entity in the service layer group based upon a request from a managing application to include the first entity in the service layer group.

7. The apparatus of claim 1, wherein the computer-executable instructions further cause the apparatus to:

analyze the indications of multicast capabilities provided by the multiple entities; and initiate creation of the service layer group based on the analysis.

8. The apparatus of claim 7, wherein the computer-executable instructions further cause the apparatus to receive the self-subscription information from the self-subscribing entity.

9. The apparatus of claim 7, wherein the computer-executable instructions further cause the apparatus to receive the self-subscription information from a managing application.

10. The apparatus of claim 7, wherein the self-subscription information comprises conditions under which to send the unsolicited request.

11. The apparatus of claim 7, wherein the conditions under which to send the unsolicited request comprise a schedule of when one or more unsolicited requests may be sent.

12. The apparatus of claim 7, wherein the conditions under which to send the unsolicited request comprise an instruction to use a given uniform resource identifier for the purpose of sending one or more kinds of unsolicited request.

13. The apparatus of claim 1, wherein the computer-executable instructions further cause the apparatus to:

receive self-subscription information, where the self-subscription information pertains to a self-subscribing entity, the self-subscription information allowing a subscription whereby the service layer entity may send unsolicited requests to the self-subscribing entity; and send an unsolicited request to the self-subscribing entity.

14. The apparatus of claim 1, wherein the computer-executable instructions further cause the apparatus to send a unicast message during fan-out to a first member of the service layer group, where the first member of the service layer group lacks a multicast capability, and where the unicast message comprises content of the multicast message.

15. The apparatus of claim 1, wherein the computer-executable instructions further cause the apparatus to send a unicast message during fan-out to a first member of the service layer group, where the first member has failed to send an acknowledgement of a previously sent multicast message.

16. The apparatus of claim 1, wherein the indication of a type of multicast is selected from a list comprising a multimedia broadcast multicast service (MBMS) and a cell broadcast.

17. The apparatus of claim 1, wherein the indications of multicast capabilities comprise a parameter of an underlying network.

18. The apparatus of claim 17, wherein the parameter of the underlying network comprises one or more of a network type, a wakeup schedule, an Internet Protocol network configuration, a supported protocol, and a 3GPP network configuration.

19. The apparatus of claim 1, receive, from the second entity, a second fanout operation request, the second fanout operation request pertaining to the service layer group and indicating that the underlying multicast capability should not be used when sending the second request to one or more members in the first subgroup.

* * * * *